(12) United States Patent
Chen et al.

(10) Patent No.: US 7,859,860 B2
(45) Date of Patent: Dec. 28, 2010

(54) SWITCHING POWER SOURCE DEVICE, SWITCHING POWER SOURCE CONTROL CIRCUIT, AND SWITCHING POWER SOURCE DEVICE CONTROL METHOD

(75) Inventors: Jian Chen, Matsumoto (JP); Koji Sonobe, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 0 days.

(21) Appl. No.: 12/461,593

(22) Filed: Aug. 18, 2009

(65) Prior Publication Data
US 2010/0067262 A1 Mar. 18, 2010

(30) Foreign Application Priority Data
Sep. 16, 2008 (JP) ............................. 2008-236171
Jun. 1, 2009 (JP) ............................. 2009-132333

(51) Int. Cl.
H02M 3/335 (2006.01)
H02M 7/217 (2006.01)

(52) U.S. Cl. .......................... 363/16; 363/17; 363/127

(58) Field of Classification Search ................... 363/16, 363/17, 127, 132, 131
See application file for complete search history.

(56) References Cited

U.S. PATENT DOCUMENTS

| | | | | |
|---|---|---|---|---|
| 6,301,128 B1 * | 10/2001 | Jang et al. | ...................... | 363/17 |
| 7,184,280 B2 * | 2/2007 | Sun et al. | ................. | 363/21.02 |
| 7,796,404 B2 * | 9/2010 | Reddy | ......................... | 363/16 |
| 2005/0122753 A1 | 6/2005 | Soldano | | |
| 2008/0055942 A1 | 3/2008 | Tao et al. | | |

FOREIGN PATENT DOCUMENTS

| | | |
|---|---|---|
| JP | 2002-369516 A | 12/2002 |
| JP | 2005-198375 A | 7/2005 |
| JP | 2005-198438 A | 7/2005 |

* cited by examiner

*Primary Examiner*—Shawn Riley
(74) *Attorney, Agent, or Firm*—Manabu Kanesaka

(57) ABSTRACT

A switching power source device for supplying power to a load includes a series resonant circuit, a plurality of main switch elements or main switch element groups for switching a current path of the series resonant circuit, a transformer for inducing a secondary current from the series resonant circuit, a plurality of synchronous rectification switch elements for rectifying the secondary current, a maximum on width control circuit for ordering a start and a completion of a maximum on width to the synchronous rectification switch element in synchronization with a timing of turning on the main switch elements or the main switch element groups, and a synchronous control circuit. The circuit controls an on period of the synchronous rectification switch element so as to turn on the synchronous rectification switch element in synchronization with a particular timing, and turn off in synchronization with another timing.

11 Claims, 37 Drawing Sheets

Fig. 8 PRIOR ART

OPERATIONAL MODE CLASSIFICATIONS

| | HEAVY LOAD (HL) | LIGHT LOAD (LL) | VERY LIGHT LOAD (VLL) |
|---|---|---|---|
| fop < fr1 | Mode 1 | Mode 2 | Mode 3 |
| fop ≧ fr1 | Mode 4 | Mode 5 | Mode 6 | fop : OPERATION FREQUENCY
fr1 : RESONANT FREQUENCY

MODE 1 WAVEFORM DIAGRAM (fop<fr1, HL)

Qa:ON, Qb:OFF (MODE 1 TIMING s1)

Qa:ON, Qb:OFF (Mode 1 TIMING s2)

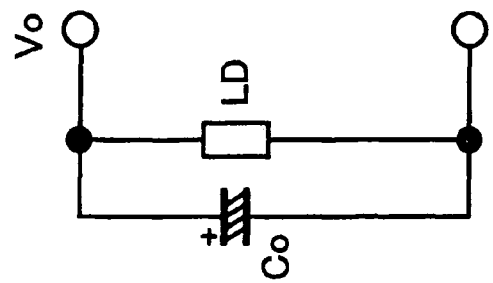
Fig. 12 PRIOR ART
Qa:ON, Qb:OFF (MODE 1 TIMING s3)
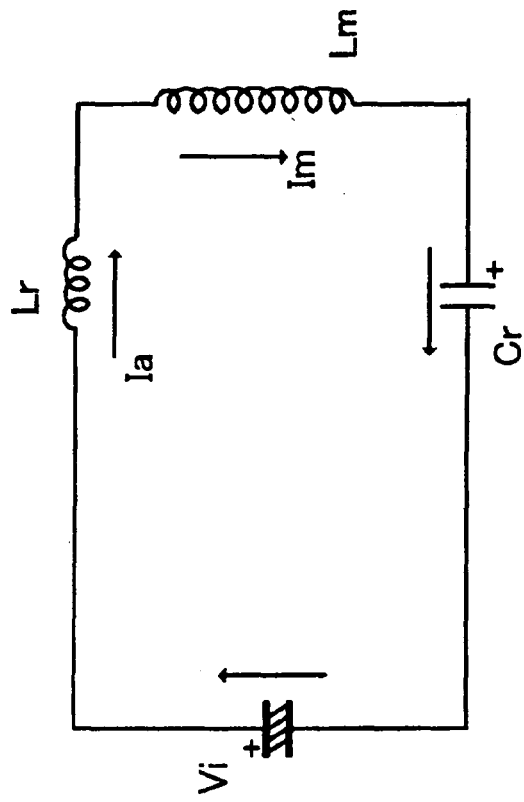

Qa:OFF, Qb:OFF (MODE 1 TIMING s4)

Qa:OFF, Qb:OFF (MODE 1 TIMING s5)

Qa:OFF, Qb:ON (MODE 1 TIMING s6)

Qa:OFF, Qb:ON (MODE 1 TIMING s7)

Qa:OFF, Qb:ON (MODE 1 TIMING s8)

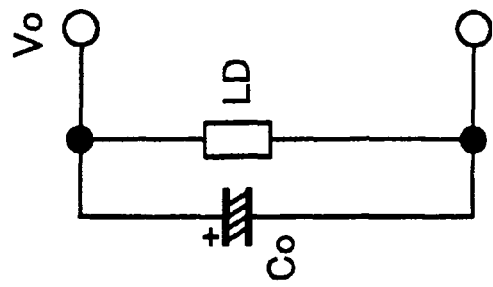
Fig. 18 PRIOR ART
Qa:OFF, Qb:OFF (MODE 1 TIMING s9)
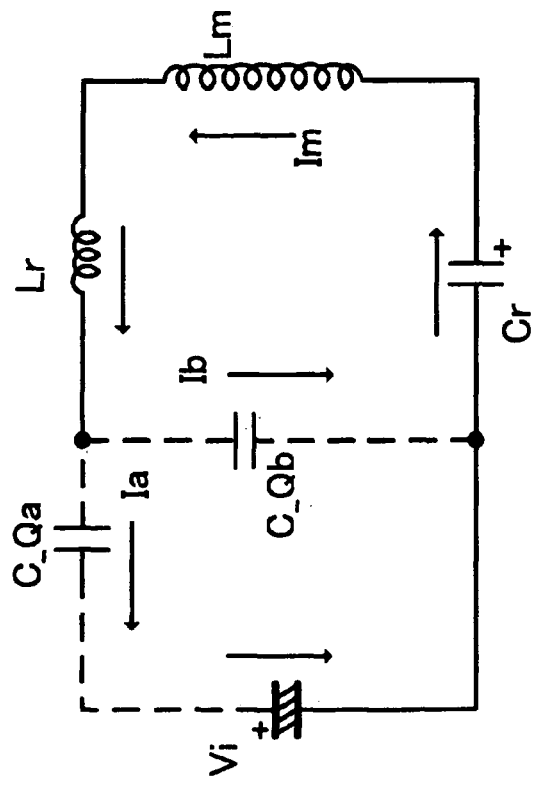

Qa:OFF, Qb:OFF (MODE 1 TIMING s10)

MODE 2 WAVEFORM DIAGRAM (fop<fr1, LL)

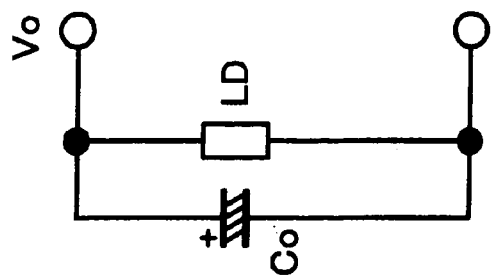
Fig. 21 PRIOR ART
Qa: ON, Qb: OFF (MODE 2 TIMING s11)
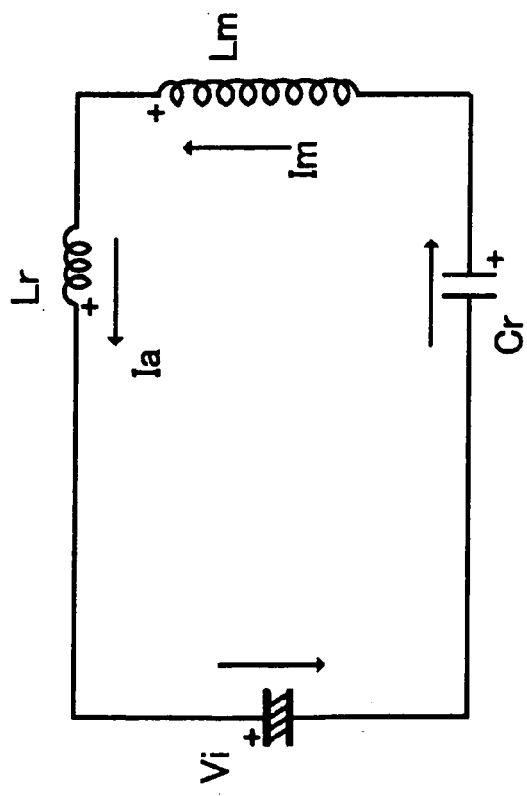

MODE 2 TIMING s12 (Qa: OFF, Qb:OFF)

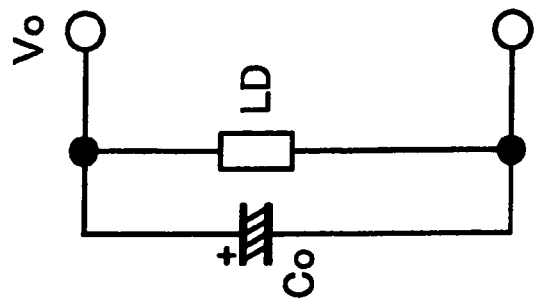
Fig. 23 PRIOR ART
MODE 2 TIMING s13 (Qa: OFF, Qb:ON)
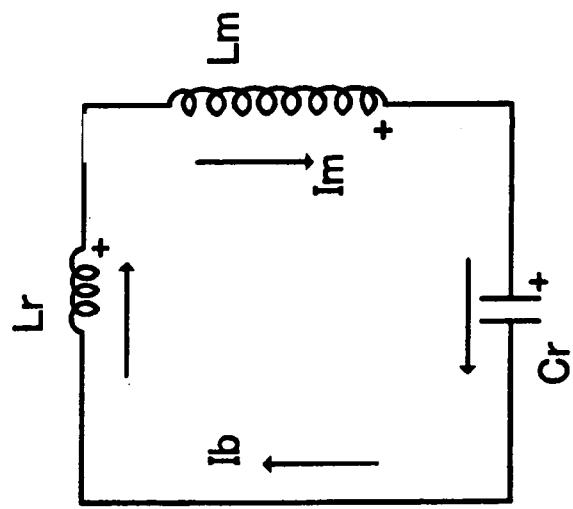

MODE 2 TIMING s14 (Qa: OFF, Qb:OFF)

MODE 3 WAVEFORM DIAGRAM (fop<fr1, VLL)

MODE 4 WAVEFORM DIAGRAM (fop≥fr1, HL)

MODE 4 TIMING s15 (Qa: OFF, Qb:OFF)

MODE 4 TIMING s16 (Qa: OFF, Qb:OFF)

MODE 5 WAVEFORM DIAGRAM (fop≥fr1, LL)

MODE 6 WAVEFORM DIAGRAM (fop≥fr1, VLL)

MODE 3 SECONDARY SIDE CURRENT WAVEFORM DIAGRAM

MODE 5 SECONDARY SIDE CURRENT WAVEFORM DIAGRAM

OPERATION WAVEFORM OF EACH PORTION

SYNCHRONOUS RECTIFICATION MOSFET CONTROL CIRCUIT

SWITCHING POWER SOURCE DEVICE, SWITCHING POWER SOURCE CONTROL CIRCUIT, AND SWITCHING POWER SOURCE DEVICE CONTROL METHOD

BACKGROUND OF THE INVENTION AND RELATED ART STATEMENT

The present invention relates to a switching power source device, a switching power source control circuit, and a switching power source device control method, including a series resonant circuit which has a current resonant inductor and a current resonant capacitor, and in particular relates to a switching power source device, a switching power source control circuit, and a switching power source device control method which eliminate a reverse flow of a current at a time of a light load.

As an existing switching power source device, one which includes the kind of current resonant type converter is known (FIG. 5). In the current resonant type converter, an input direct voltage Vi is applied to a series resonant circuit which includes a resonant inductor Lr and a resonant capacitor Cr. By turning on and off two main switch elements Qa, Qb configured of metal-oxide-semiconductor field-effect transistors (MOSFET), or the like, and controlling a path of a primary side current flowing in a first coil L1 of a power converting transformer T, a current with a sinusoidal waveform flows in the first coil L1 of the transformer T. Also, rectification diodes D1, D2, which rectify induced secondary currents I1, I2 respectively, and an output capacitor $C_0$, which smoothes an output voltage $V_0$ to a load LD, are connected to a second coil L2 and a third coil L3 of the transformer T (a coil ratio of L1:L2:L3 is taken to be n:1:1). Furthermore, the output voltage $V_0$ to the load LD is returned to a drive circuit 3 of the main switch elements Qa, Qb via an error amplifier 1 and a voltage control oscillation circuit (VCO) 2, controlling a current and voltage flowing in the first coil L1 of the transformer T, and controlling the output voltage $V_0$ at a constant voltage. The VCO 2 functions so that, when determining that due to an output of the error amplifier 1, the output voltage $V_0$ is higher than a set voltage, or is a light load, it increases an output frequency thereof, while when determining that the output voltage $V_0$ is lower than the set voltage, or is a heavy load, it reduces the output frequency thereof.

However, when using this kind of switching power source device as a low voltage with high current power source, when the secondary currents I1, I2 flow into the rectification diodes D1, D2 provided on the secondary side of the transformer T, due to a forward drop voltage $V_F$ of the rectification diodes D1, D2, a large power loss $V_F \times I_0$ occurs. $I_0$ is either one of the secondary currents I1, I2. Therefore, as shown in FIG. 6, a separately excited drive type of current resonant circuit is used in which MOSFETs Qs1, Qs2, each of which has low on resistance, are connected as synchronous rectification switch elements in place of the rectification diodes D1, D2, a synchronous rectification is carried out, and the power loss is reduced. The MOSFETs Qs1, Qs2 shown in FIG. 6 is individually on-off controlled by the drive circuit 3 in synchronization with an operation frequency fop for turning on and off the primary side main switch elements Qa, Qb, so that the secondary currents I1, I2 are alternately accumulated in the capacitor $C_0$.

Since this kind of switching power source device is configured in such a way as to cause a switching operation of the main switch elements Qa, Qb, and obtain an optional direct current output via the voltage converting transformer T. Therefore, a charge accumulated in the capacitor $C_0$ is discharged, a current flowing back to the transformer T side (a reverse current) occurs, and a power loss in a reverse flow area becomes a problem depending on a size of the load LD connected to the secondary side, and the like.

FIG. 7 is a circuit diagram illustrating one example of a secondary side diode rectification current resonant type converter. In FIG. 7, the transformer T of the current resonant type converter of FIG. 5 is divided into an exciting inductance element Lm and an ideal transformer Ti, and an operating principle thereof is clearly illustrated. Herein, prior to a description of the power loss in the reverse flow area, a description will be given of the operating principle of the current resonant type converter.

With the kind of current resonant type converter shown in FIG. 7, it is possible to define the following two kinds of basic current resonant frequency. Herein, Lr, Lm, and Cr indicate an inductance of the resonant inductor Lr, the exciting inductance element of the transformer T, and a capacitance of the resonant capacitor Cr, respectively.

Expression 1

$$fr1 = \frac{1}{2\pi\sqrt{Lr \cdot Cr}} \quad (1)$$

Expression 2

$$fr2 = \frac{1}{2\pi\sqrt{(Lr + Lm) \cdot Cr}} \quad (2)$$

With the switching power source device of FIGS. 5 and 7, when there is a supply of power to the load LD, the voltage of the exciting inductance element Lm of the transformer T is clamped at $n \times (V_0 + V_F)$ in accordance with the output voltage $V_0$, the exciting inductance element Lm is not involved in the current resonance, and power is supplied to the secondary side circuit by operating at a first resonant frequency fr1 (refer to Expression 1 above) decided by the resonant capacitor Cr and resonant inductor Lr. In this case, a sum of a current Im and a resonant current Ir flowing in the exciting inductance element Lm flows as a charge-discharge current to the resonant capacitor Cr. At this time, the operation frequency fop of the main switch elements Qa, Qb is controlled by the VCO 2 so as to stabilize the output voltage $V_0$.

A second resonant frequency fr2 is a resonant frequency when no supply of power is carried out to the load LD connected to the secondary side of the transformer T. Since the ideal transformer Ti does not function as a transformer, and the voltage of the exciting inductance element Lm of the transformer T is not clamped, a resonance operation is carried out mainly by the capacitance Cr of the resonant capacitor Cr, the resonant inductance Lr of the resonant inductor Lr, and the exciting inductance element Lm.

Regarding a specific resonance operation of the current resonant type converter of FIG. 7, it is possible to divide into six operational modes (Modes 1 to 6), as shown in FIG. 8, depending on a relationship between its operation frequency fop and the first resonance frequency fr1 (hereafter called simply the resonance frequency), and on the size of the load LD connected to the secondary side of the transformer T.

That is, in FIG. 8, Modes 1 to 3 are cases in which the operation frequency fop is lower than the resonance frequency fr1, while Modes 4 to 6 are cases in which the operation frequency fop is equal to or higher than the resonance frequency fr1. Also, a heavy load (HL) condition is such that the size of the connected load LD is 50% or more of a rated load (maximum load) of the switching power source device, a light load (LL) condition is such that the size is 20% to 50%, and a very light load (VLL) condition is such that the size is 20% or less.

Firstly, a description will be given for the operational modes of the current resonant type converter of FIG. 5 by using the operation waveforms shown in FIG. 9.

FIG. 9 shows an operation waveform of the first operational mode (Mode 1), in which the operation frequency fop (one cycle of the switching operation is taken to be "Top") is lower than the resonance frequently fr1 (the resonance frequency at that time is taken to be "Tr"), and the load LD is in the heavy load condition. Herein, a description will be given for one operation frequency Top which is divided into ten operational conditions (timings s1 to s10), in order from the timing s1 (hereafter, the term "timing sj" (j=1 to 16) indicates a time period, rather than an instant) immediately after one main switch element Qa is turned on.

In FIG. 9, (A) and (B) are gate voltages Vga, and Vgb of the main switch elements Qa, and Qb, which are outputs of the drive circuit 3. C and D are currents Ia and Ib which flow in the main switch elements Qa, Qb. E is an inter-terminal voltage Vc of the resonant capacitor Cr, and F and G are currents I1 and I2 which flow in the rectification diodes D1 and D2.

FIG. 10 is a circuit diagram illustrating the operational condition in the timing s1 of the first operational mode. Herein, a state immediately after the main switch element Qa is turned on is shown. An operational result of the preceding timing s10 is taken over, and the current Ia is flowing in the direction shown by the arrow. Also, the other main switch element Qb is off. At this time, the exciting current Im flows in the exciting inductance element Lm, in a direction opposite to that of the resonant current Ir. As it is bigger than the resonant current Ir, it flows as a discharge current in a direction discharging the charge of the resonant capacitor Cr. A current induced in the second coil L2 by the ideal transformer Ti, based on the resonant current Ir of the primary side resonant circuit, is supplied to the load LD from the rectification diode D1.

In the operational condition in the timing s2 shown in FIG. 11, the main switch element Qa continues to be on, and Qb continues to be off. However, the exciting current Im, which had been flowing in the direction opposite to that of the resonant current Ir, flows in the same direction as the resonant current Ir, and begins to charge the resonant capacitor Cr. Then, in the same way as in the preceding timing s1, the sinusoidal wave current I1 is caused to flow in the secondary side rectification diode D1 (refer to (F) of FIG. 9) by the ideal transformer Ti, based on the resonant current Ir of the primary side resonant circuit, and power is supplied to the load LD.

In the timing s3 shown in FIG. 12, the main switch element Qa continues to be on, and Qb continues to be off. However, a half cycle (Tr/2) of a resonance frequency Tr, determined by the size of the resonant inductor Lr and resonant capacitor Cr, has elapsed, and power has ceased to be supplied to the secondary side from the primary side of the ideal transformer Ti. However, as the operation frequency fop is lower than the resonance frequency fr1, and the main switch element Qa is in the on condition, the primary side resonant circuit resonates at the second resonance frequency fr2, and the resonant capacitor Cr is charged by the exciting current Im. As the cycle of the second resonance frequency fr2 is extremely long in comparison with the cycle of the first resonance frequency fr1, the resonance waveform in the timing s3 is approximately a straight line.

The timing s4 shown in FIG. 13 corresponds to a dead time when the two main switch elements Qa, Qb are both off.

Herein, currents Ia, Ib flow, respectively, through a distributed capacity C_Qa of the main switch element Qa in the off condition, and a distributed capacity C_Qb of the other main switch element Qb in the off condition, in the directions shown by the arrows of FIG. 13, changing the voltage between the two ends of the two distributed capacities C_Qa and C_Qb. At this time, the resonant capacitor Cr, and the two distributed capacities C_Qa and C_Qb, form a resonant circuit of the resonant inductance Lr and exciting inductance element Lm, and carry out a resonance operation so as to charge the resonant capacitor Cr. However, no power is supplied to the secondary side from the primary side. As the capacitance of the resonant capacitor Cr is far bigger than the capacitance of the distributed capacities C_Qa, C_Qb, it is also possible, in the timing s4, to view the resonant capacitor Cr as a constant-voltage source.

In the timing s5 shown in FIG. 14, the two main switch elements Qa, Qb continue to be in the off condition, but in the timing s4 the voltage between the two ends of the distributed capacity C_Qb increases. When taking the side of the distributed capacity C_Qb connected to the resonant capacitor Cr in FIG. 13 to be a reference potential, the absolute value increases at a negative voltage. As a result, in the main switch element Qb, a body diode D_Qb thereof attains a conduction state. At this time, by the resonant circuit resonating on the primary side, a current I2 begins to flow from the primary side of the ideal transformer Ti, via the third coil L3, and a supply of power to the load LD begins. That is, as the exciting current Im flowing in the exciting inductance element Lm flows in a direction the reverse of that of the resonant current Ir as a bigger current than the resonant current Ir, the resonant capacitor Cr continues to be charged. As the current Ib is flowing in the body diode D_Qb (the orientation of the current is the direction shown by the arrow), and the other main switch element Qa is off, the terminal of the first coil L1 of the transformer T on the side connected to the resonant capacitor Cr becomes a high voltage side, while the terminal on the opposite side is a low voltage side.

In the timing s6 shown in FIG. 15, the main switch element Qb is in a condition immediately after being turned on, and the current Ib is flowing there, as before, in the direction shown by the arrow. Also, the other main switch element Qa is off. Consequently, the terminal of the first coil L1 of the transformer Ton the side connected to the resonant capacitor Cr becomes the high voltage side (the terminal on the opposite side is the low voltage side), and power induced in the secondary side third coil L3 from the primary side resonant circuit by the ideal transformer Ti is supplied to the load LD from the rectification diode D2. At this time, since the exciting current Im flows in the exciting inductance element Lm in a direction the reverse of that of the resonant current Ir, and is bigger than the resonant current Ir, the resonant capacitor Cr is charged by the current differential (Im-Ir).

In the timing s7 shown in FIG. 16, the main switch element Qa continues to be off, and Qb continues to be in on. However, the exciting current Im becomes smaller than the resonant current Ir, and the exciting current Im, which had been flowing in the direction opposite to that of the resonant current Ir, flows in the same direction as the resonant current Ir (the direction shown by the arrow of FIG. 16), and the charge accumulated in the resonant capacitor Cr begins to be discharged. Then, from the primary side resonant circuit, a sinusoidal wave current is caused to flow in the secondary side rectification diode D2 (refer to (G) of FIG. 9) by the ideal transformer Ti, and power is supplied to the load LD.

In the timing s8 shown in FIG. 17, the main switch element Qa continues to be off, and Qb continues to be on. However, the half cycle resonance operation in the resonant inductor Lr and resonant capacitor Cr has finished, and power has ceased to be supplied to the secondary side from the primary side. Also, while the resonant capacitor Cr continues the discharge, the primary side resonant circuit carries out a resonance operation at the second resonance frequency fr2.

The timing s9 shown in FIG. 18 corresponds to a dead time when the two main switch elements Qa, Qb are both off. Herein, the currents Ia, Ib flow, respectively, through the distributed capacity C_Qa of the main switch element Qa, and the distributed capacity C_Qb of the other main switch element Qb, in the directions shown by the arrows of FIG. 18, changing the voltage between the two ends of the two distributed capacities C_Qa and C_Qb. At this time, the resonant capacitor Cr, and the two distributed capacities C_Qa, C_Qb configure a resonant circuit of the resonant inductance Lr and exciting inductance element Lm, and carry out a resonance operation so as to discharge the resonant capacitor Cr. However, no power is supplied to the secondary side from the primary side. As the capacitance of the resonant capacitor Cr is far bigger than the capacitance of the distributed capacities C_Qa, C_Qb, it is also possible, in the timing s9, to view the resonant capacitor Cr as a constant-voltage source.

In the timing s10 shown in FIG. 19, the two main switch elements Qa, Qb continue to be in the off condition, but as a result of the voltage between the two ends of the distributed capacity C_Qa increasing in the timing s9, in the main switch element Qa, a body diode D_Qa thereof attains a conduction state. At this time, by the resonant circuit resonating on the primary side, a current I1 begins to flow from the primary side of the ideal transformer Ti, via the second coil L2, and a supply of power to the load LD begins. Also, the exciting current Im flowing in the exciting inductance element Lm flows in a direction opposite to that of the resonant current Ir as a bigger current than the resonant current Ir, and the resonant capacitor Cr is further discharged.

FIG. 20 is an operation waveform diagram illustrating a current and voltage waveform of each portion in the second operational mode of the current resonant type converter. Herein, a description will be given of the second operational mode (Mode 2), in which the operation frequency fop is lower than the resonance frequency fr1, and the load LD is in the light load condition.

As shown in (A) and (B) of FIG. 20, a predetermined dead time is provided in the gate voltages Vga, Vgb of the main switch elements Qa, Qb. Also, as the load LD is in the light load condition, the currents Ia, Ib flowing in the main switch elements Qa, Qb decrease, and a fluctuation range of the inter-terminal voltage Vc of the resonant capacitor Cr shown in (E) of FIG. 20 also decreases. Also, as the exciting current Im does not change so much from the time of the heavy load, the effect of the exciting current Im becomes relatively large, and there is more phase lead than at the time of the heavy load. Hereafter, a description will be given only of operational conditions differing from the circuit operations at the time of the heavy load shown in FIG. 9.

FIG. 21 shows an operational condition in a timing s11 immediately after the main switch element Qa is turned on. This condition is a condition in which the main switch element Qa is on, and Qb is off. The resonant capacitor Cr forms a resonant circuit of the resonant inductance Lr and exciting inductance element Lm but, unlike in the timing s1 (refer to FIG. 10) in Mode 1 shown in FIG. 9. Since the voltage between the two ends of the exciting inductance element Lm (the + side of FIG. 21 is a high potential side) is low, power cannot immediately be supplied from the primary side to the secondary side, even though the main switch element Qa is turned on.

Subsequently, the resonant capacitor Cr discharges, and its inter-terminal voltage Vc decreases. Upon satisfying an Expression 3, at the end of the timing s11, the resonance operation in the primary side resonant circuit in the timing s1 begins, and power is supplied from the primary side to the secondary side. Herein, Vf is a forward voltage of the secondary side rectification diodes D1, D2.

$$(Vi-Vc)*Lm/(Lr+Lm)=n*(V_0+Vf) \tag{3}$$

FIG. 22 illustrates an operational condition of a dead time timing s12, in which a half cycle (Top/2) of the switching operation has elapsed, and the two main switch elements Qa, Qb are both turned off. In this case, the body diode D_Qb of the main switch element Qb is conductive and, continuing from the preceding timing s4, the exciting current Im (to be precise, this is the resonant current of the resonant circuit configured of the resonant capacitor Cr, resonant inductor Lr, and exciting inductance element Lm) flows into the resonant capacitor Cr. However, as the voltage between the two ends of the exciting inductance element Lm (the + side of FIG. 22 is a high potential side) is insufficient, unlike in the operational condition (timing s5) shown in FIG. 14, it is not possible to supply power to the secondary side.

FIG. 23 illustrates the operational condition of the next timing s13. As shown here, the main switch element Qb is on, and the resonant capacitor Cr configures a resonant circuit of the resonant inductance Lr and exciting inductance element Lm. However, unlike the case of the timing s6 of the first operational mode (Mode 1) shown in FIG. 9, as the voltage between the two ends of the exciting inductance element Lm (the + side of FIG. 23 is a high potential side) is low, power cannot immediately be supplied from the primary side to the secondary side, even when the main switch element Qb is turned on.

Subsequently, the resonant capacitor Cr is charged. When its inter-terminal voltage Vc attains an operational condition (the condition of the timing s6 of FIG. 15) in which it satisfies an Expression 4, power is supplied from the primary side to the secondary side by a resonance operation of the resonant inductance Lr and resonant capacitor Cr.

$$Vc*Lm/(Lr+Lm)=n*(V_0+Vf) \tag{4}$$

Subsequently, proceeding sequentially from the timing s6 to the timings s7, s8, on arriving at the timing s9 in which the two main switch elements Qa, Qb are both in the off condition, the currents Ia, Ib flow, respectively, through the distributed capacity C_Qa of the main switch element Qa, and the distributed capacity C_Qb of the other main switch element Qb, in the directions shown by the arrows of FIG. 18, changing the voltage between the two ends of the two distributed capacities C_Qa and C_Qb. At this time, the load LD is in the light condition. Therefore, in the timing s14 in which the body diode D_Qa of the main switch element Qa is conductive, as shown in FIG. 24, the voltage between the two ends of the exciting inductance element Lm (the + side of FIG. 24 is a high potential side) is insufficient. Unlike the operational condition (timing s10) shown in FIG. 19, it is not possible to supply power to the secondary side.

Next, a description will be given for the third operational mode (Mode 3), in which the operation frequency fop is lower than the resonance frequency fr1, and the load LD is in an even smaller very light load (VLL) condition. FIG. 25 is an operation waveform diagram illustrating a current and voltage waveform of each portion in the third operational mode of the current resonant type converter. In this case, the resonant current Ir further decreases, and the fluctuation range of the inter-terminal voltage Vc of the resonant capacitor Cr also further decreases. The voltage Vc of the resonant capacitor Cr is controlled by the exciting current Im (or by the resonant current of the resonant circuit configured of the resonant capacitor Cr, resonant inductor Lr, and exciting inductance element Lm), and there is even more phase lead.

In the timing s2, the kind of resonant current Ir and exciting current Im shown in FIG. 11 flow, but the resonant current Ir is far smaller than the exciting current Im, and the inter-terminal voltage Vc of the resonant capacitor Cr is controlled by the exciting current Im. For this reason, the charge and discharge time by the resonant current Ir from the resonant inductor Lr becomes shorter. Consequently, in the third operational mode (Mode 3) in which the load becomes very light, a shift is made to the condition of the timing s3 in a shorter time than in the first operational mode (the heavy load Mode 1) and second operational mode (the light load Mode 2).

In the same way, in the timing s7, the kind of resonant current Ir shown in FIG. 16 is far smaller than the exciting current Im, and the inter-terminal voltage Vc of the resonant capacitor Cr is controlled by the exciting current Im. For this reason, the charge and discharge time by the resonant current Ir from the resonant inductor Lr becomes shorter, and in the operational mode with the very light load (Mode 3), a shift is made to the operational condition of the timing s8 earlier than when there is a heavy load or a light load.

Furthermore, operation waveforms for the fourth to sixth operational modes (Modes 4 to 6), in which the operation frequency fop is higher than, or equal to, the resonance frequency fr1, are shown in FIGS. 26, 29 and 30 respectively.

FIG. 26 is an operation waveform diagram illustrating a current and voltage waveform of each portion in the fourth operational mode of the current resonant type converter. In the fourth operational mode (Mode 4), the operation frequency fop is equal to or higher than the resonance frequency fr1, and the load LD is in a heavy load condition.

FIG. 27 illustrates an operational condition in a timing s15 in FIG. 26, in which the two main switch elements Qa, Qb are turned off simultaneously. In the case of the fourth operational mode (Mode 4), even though the main switch element Qa is turned off in the timing s15, the body diode D_Qb of the main switch element Qb is conductive, and continues a discharge of energy accumulated in the resonant inductor Lr, but the + side potential of the exciting inductance element Lm is maintained. For this reason, the resonant current Ir flows in the ideal transformer Ti, and power is supplied from the primary side to the secondary side. In this case, as a voltage $(n \times (V_O + V_F) + Vc + V_F)$ is applied to the resonant inductor Lr, and it takes on a form approximating a constant voltage discharge, the current I1, which decreases approximately linearly, flows in the rectification diode D1. In the next timing s5, the resonant current Ir flows in the reverse direction, and the sinusoidal wave current I2 begins to flow in the secondary side rectification diode D2. Consequently, in the fourth operational mode, the secondary side sinusoidal wave currents I1, I2 flow consecutively.

FIG. 28, in the same way, illustrates an operational condition in a timing s16, in which the two main switch elements Qa, Qb are turned off simultaneously. In this case, even though the main switch element Qb is turned off, the body diode D_Qa of the main switch element Qa is conductive. Also, due to the discharge of the resonant inductor Lr, the + side potential of the exciting inductance element Lm is maintained, and power is supplied to the secondary side.

FIG. 29 is an operation waveform diagram illustrating a current and voltage waveform of each portion in the fifth operational mode of the current resonant type converter. Herein, a description will be given of the fifth operational mode (Mode 5), in which the operation frequency fop is equal to or higher than the resonance frequency fr1, and the load LD is in a light load condition.

In each of the timings s15, s16, immediately after the two main switch elements Qa, Qb are turned off simultaneously, it is possible to supply power to the secondary side. However, as the load LD is in the light load condition, in each of the subsequent timings s11, s12, and s13, s14, in the same way as in the second operational mode (refer to FIG. 20), a condition is such that no power is supplied to the secondary side.

FIG. 30 is an operation waveform diagram illustrating a current and voltage waveform of each portion in the sixth operational mode of the current resonant type converter. In Mode 6, in which the operation frequency fop is equal to or higher than the resonance frequency fr1, and there is a very light load (VLL) condition, during a period in which the two main switch elements Qa, Qb are each turned on, the timings s11, s3, and s13, s8 appear, in which no power is supplied to the secondary side.

Heretofore, a description has been given for the resonance operation in the six operational modes of the current resonant type converter shown in FIG. 7. Further consideration is made on a separately excited drive synchronous rectification in the current resonant type converter of FIG. 6, in which the secondary side rectification diodes D1, D2 are replaced with the MOSFETs Qs1, Qs2, which have low resistances.

As synchronous rectification methods, there are a self excitation drive method and a separate excitation drive method. Regarding the separate excitation drive method, by building a logic circuit into a power source IC in order to emit a drive signal in the logic circuit, it becomes easy for a power source maker to realize a synchronous rectification function. Consequently, all IC manufacturers are devising various separate excitation drive methods (refer to U.S. Pat. No. 7,184,280: Patent Document 1, U.S. Patent Pub. App. No. 2008/0055942: Patent Document 2, U.S. Patent Pub. App. No. 2005/0122753: Patent Document 3, Japanese Unexamined Patent Application Publication No. JP-A-2005-198438: Patent Document 4, and Japanese Unexamined Patent Application Publication No. JP-A-2005-198375: Patent Document 5).

As to the separate excitation drive synchronous rectification, it seems to be sufficient that synchronous drive signals of the MOSFETs Qs1, Qs2 are synchronized with the gate signals which conduct switching controls over the main switch elements Qa, Qb. However, in actual practice, if a reverse flow area is not detected in each operational mode and a conversion is not made to a drive signal synchronized with each one, the charge accumulated in the output capacitor $C_O$ is discharged, and a current flowing back to the transformer T side (a reverse current) occurs, thereby decreasing the efficiency. Furthermore, there emerges a danger of a circuit breakage due to the power flowing back to the primary side.

Herein, the reverse flow area in each operational mode is decided by the relationship between the operation frequency fop and resonance frequency fr1 of the current resonant type converter, and the load LD. Of these, the operation frequency fop changes depending on circuit parameters and the load condition, but the resonance frequency fr1 is determined by the size of the resonant capacitor Cr and resonant inductor Lr. Consequently, although a synchronous rectification which synchronizes the synchronous drive signal with a power switching signal is a simple method, in that case, a countermeasure is needed to eliminate the following five reverse flow areas.

That is, the switching power source device which turns the two main switch elements Qa, Qb on and off using the gate signals Vga, Vgb respectively, and supplies the secondary currents I1, I2, can prevent the secondary currents I1, I2 from flowing back in the first operational mode (Mode 1) shown in FIG. 31, by reliably turning off the synchronous control MOSFETs Qs1, Qs2 in the timings s3, s8 of a latter half of the half cycle (Top/2) of the switching operation shown in FIG. 9. Consequently, in the event that the kind of gate signals Vga, Vgb shown in (A) and (B) in FIG. 31 are output as they are to the synchronous control MOSFETs Qs1, Qs2 as synchronous drive signals Vgs 1, Vgs 2, a reverse flow current flows in an area (Range A) of the timings s3, s8.

Also, in the case of the second operational mode (Mode 2), apart from Range A in which the reverse current occurs, there is also a danger of the reverse current occurring in an area Range B shown in FIG. 32 (corresponding to the timings s11 and s13 shown in FIG. 20).

In the same way, in the case of the third operational mode (Mode 3), as shown in FIG. 33, as well as the reverse current occurring in Range A and Range B, the reverse current also occurs in Range C (this is within a half cycle of a resonance cycle Tr, but corresponds to an area in which the resonance is finished).

In the case of the fourth operational mode (Mode 4) shown in FIG. 34, there is no danger of the reverse current occurring, because the secondary currents I1, I2 are consecutive.

In the fifth operational mode (Mode 5) shown in FIG. 35, the reverse current occurs in an area Range D (corresponding to the timings s11, s13 shown in FIG. 29).

In the case of the sixth operational mode (Mode 6), as shown in FIG. 36, as well as the reverse current occurring in Range D, the reverse current also occurs in an area Range E (corresponding to the timings s3 and s8 shown in FIG. 30). Consequently, in the event of applying signals synchronized with the gate signals Vga, Vgb (the same signals) as the synchronous drive signals Vgs1, Vgs2 to the synchronous control MOSFETs Qs1, Qs2, as the reverse current occurs in each of the operational modes 1 to 3, and 5 and 6, it has been necessary to form individual Vgs 1 and Vgs 2 signal waveforms in the areas (Ranges A to E) corresponding thereto.

Therefore, with the heretofore known switching power source devices, there is provided a constant width pulse (CWP) generation circuit which outputs a CWP signal with a pulse width slightly narrower than an on period of the gate signals Vga, Vgb, forming the waveforms of the synchronous drive signals Vgs 1, Vgs2. That is, when the operation frequency fop is the same as, or higher than, the resonance frequency fr1, the synchronous drive signals Vgs 1, Vgs2 are synchronized with the gate signals Vga, Vgb, and when the operation frequency fop is lower than the resonance frequency fr1, the synchronous drive signals Vgs 1, Vgs2 are synchronized with the constant width pulse signal CWP, causing it to finish (for example, refer to Patent Document 1). Because of this, even in the case of replacing the secondary side rectification diodes D1, D2 with the MOSFETs Qs1, Qs2, which have low on resistance, it is possible to prevent the reverse flow current from the secondary side.

However, with the invention described in Patent Document 1, as a timing of a start-up of the synchronous drive signals Vgs 1, Vgs2 is always synchronized with the gate signals Vga, Vgb, it is difficult to prevent the reverse current immediately before the secondary current begins to flow, as in the reverse current area (Range B) in the second operational mode (Mode 2). Also, in the cases of Modes 4 to 6, in which the operation frequency fop is the same as, or higher than, the resonance frequency fr1, in the event the synchronous drive signals Vgs1, Vgs2 are synchronized with the gate signals Vga, Vgb, it is not possible to prevent the reverse current in the light load (LL) condition or very light load (VLL) condition.

As a different switching power supply device, a method for comprising the kind of synchronous rectification MOSFET control circuit shown in FIG. 37(A) is known (for example, Patent Document 2). Also, an operation waveform of each portion thereof is shown in FIG. 37(B). This is a method which compares a drain-to-source voltage (Vds (on)) of a synchronous rectification switch element (MOSFET) with a reference voltage REF in a comparator 510, detects that the synchronous rectification MOSFET, or a body diode thereof, is conductive and, provides a signal to the synchronous rectification MOSFET causing the synchronous rectification MOSFET to be turned on only for a period that the conductivity is detected and a gate signal Vgp is high (H). That is, the method generates a comparison signal Vdsc, which is an output of the comparator 510, in an AND circuit 430, and an AND signal of the gate signal Vgp of the primary side main switch elements Qa, Qb, and outputs them as synchronous drive signals Vgs (that is, Vgs1 and Vgs2), of which the waveform has been formed, to the MOSFETs Qs1 and Qs2, which are the switch elements.

Generally, the drain-to-source voltage Vds of the MOSFET, in a condition in which the MOSFET is turned off and a current is flowing in the body diode, becomes a body diode forward drop voltage $V_F$ (to be precise, taking a source potential as a reference potential, it is $-V_F$). Meanwhile, in a condition in which the MOSFET is turned on, the drain-to-source voltage is a product of the on resistance of the MOSFET and the current flowing, and a value (an absolute value) thereof is normally smaller than $V_F$. The reference voltage REF firstly, detecting that a current is flowing in the body diode, allows the MOSFET to be turned on, and subsequently, the MOSFET being turned on, in order that it is possible to cause the MOSFET to continue to be turned on even when the drain-to-source voltage Vds is small, the absolute value of the reference voltage REF is made considerably small (actually, taking noise and the like into consideration, it is necessary to make the absolute value large enough to be able to detect without error that the MOSFET, or the body diode thereof, is conductive).

However, as shown in FIG. 37(B), when the secondary current Is decreases to zero, how small the value of the reference voltage REF is, at some point the product of the on resistance of the MOSFET and the current flowing will become smaller. On this happening, a condition is such that the comparison signal Vdsc inverts, the MOSFET is turned off, and a current flows in the body diode, whereon the drain-to-source voltage Vds becomes $-V_F$. Because of this, the comparison signal Vdsc inverts again, and the MOSFET is turned on again, as a result of which the comparison signal Vdsc further inverts. Subsequently, as shown in the error area of FIG. 37(B), the turning on and off of the MOSFET is repeated at a high frequency until the secondary current Is is definitely zero. This resonance phenomenon becomes more noticeable as the load becomes lighter, and the secondary current Is decreases. As such, as a high frequency resonance is repeated every time the secondary current Is decreases to zero, the invention described in Patent Document 1 is a method having a problem from the point of view of noise and power conversion efficiency.

As an invention which takes into consideration a conducting voltage of the internal diode, and sets a turn on threshold value ($V_{TH2}$), there is Patent Document 3. Herein, as a turn on timing of the synchronous drive signal is decided only by the conducting voltage of the internal diode, there is a problem in that a malfunction is liable to occur in the dead time set in the primary side gate signals Vga, Vgb. Also, as a threshold value ($V_{TH1}$) which determines a turn off timing is a minute voltage value of around −20 mV, and what is more a negative value, there is a problem in that it is easily effected by noise, and the timing of the off operation is unstable.

Also, with a different switching power source device, the primary side resonant current is detected with a current transformer, the exciting current is detected with a secondary side auxiliary coil, and a resonant current detection signal is compared with an exciting current detection signal. A synchronous rectification signal is generated based on a signal detecting whether or not a comparison result signal, a power switching signal, and the resonant current detection signal exceed 0 A (for example, Patent Document 4).

With the technology of Patent Document 4, it is possible to solve the reverse flow problem in each non-consecutive mode but, as the on timing of the synchronous rectification MOSFETS is delayed in the operational modes (Modes 1 and 4) with the heavy load condition, the power efficiency decreases. Moreover, as the current transformer and auxiliary coil are used in the detection circuit, a circuit configuration becomes complex, and so on, it is difficult to design to an appropriate adjusted value, and it is not desirable from a point of view of cost either.

Furthermore, as a synchronous rectification circuit which may prevent the current from flowing in the reverse direction, and a power converter which attempts a reduction in power conversion loss, there is the invention described in Patent Document 5. This invention compares a synchronous rectification transistor source-to-drain voltage in a comparator circuit and, when detecting a reverse direction current, attempts to prevent it using a switching unit. Herein, although a timing in which the synchronous rectification transistor is turned off is decided, there is no mention of a timing in which it is turned on. Consequently, the invention is not effective as a measure for preventing the reverse flow of the current (Ranges B and D) in the second operational mode (Mode 2), third operational mode (Mode 3), fifth operational mode (Mode 5), and sixth operational mode (Mode 6).

As such, with the heretofore known switching power source devices, there is no drive circuit which reliably prevents the reverse flow of the secondary current to the primary side in all six of the operational modes (refer to FIG. 8). In particular, there has been a need to execute a simple synchronous rectification which prevents the current reverse flow in the light load condition, and also prevents a malfunction by stably detecting the synchronous rectification MOSFET drain-to-source voltage (Vds).

The invention has been made in view of such problems. Therefore, an object of the present invention is to provide a switching power source device, a switching power source control circuit, and a switching power source device control method which can prevent a reverse flow of a current in any operational mode, and further realize a stable synchronous rectification function.

Further objects and advantages of the invention will be apparent from the following description of the invention.

SUMMARY OF THE INVENTION

In the invention, in order to solve the heretofore described problem, there is provided a switching power source device wherein an input direct voltage is applied to a series resonant circuit, the device generates a predetermined output voltage via a transformer and supplies power to a load.

In the switching power source device, the series resonant circuit includes a current resonant inductor and a current resonant capacitor. Also, a plurality of main switch elements or main switch element groups, comprising, for example, MOSFETs, switch a current path of the series resonant circuit by alternately turning on and off. A transformer induces a current from the series resonant circuit to a secondary side by on-off controlling the main switch elements or main switch element groups on a primary side. A plurality of synchronous rectification switch elements, in which internal diodes are connected in parallel, are each turned on and off in response to either the plurality of main switch elements or main switch element groups, rectifying the secondary current of the transformer. A maximum on width control circuit, in synchronization with a timing in which the main switch elements or main switch element groups are turned on, indicates a start of a maximum on width to the synchronous rectification switch element and, after a predetermined time, indicates a completion of the maximum on width. A synchronous control circuit controls an on period of the synchronous rectification switch element in such a way as to turn on the synchronous rectification switch element in synchronization with a timing in which the maximum on width control circuit indicates the start of the maximum on width, or a timing of a conduction of the internal diodes detected by an inter-terminal voltage signal of the synchronous rectification switch element, whichever timing is later, and turn off the synchronous rectification switch element in synchronization with a timing in which the main switch elements or main switch element groups are turned off, or a timing in which the maximum on width control circuit indicates the completion of the maximum on width, whichever timing is earlier.

According to the switching power source device, the switching power source control circuit, and the switching power source device control method of the invention, since the on period of the synchronous rectification switch element is controlled by utilizing a gate on-off signal and maximum on width signal applied to a gate of the main switch elements or main switch element groups, it is possible to eliminate all noise except at a time when the main switch elements or main switch element groups are turned on.

Also, the conduction voltage of the diodes connected in parallel in the synchronous rectification switch element is detected from the synchronous rectification switch element inter-terminal voltage level, and is used only in the synchronous rectification switch element turn on timing control, and the maximum on width signal is effectively applied. Therefore, it is possible to provide a switching power source device control method, a switching power source control circuit, and a switching power source device which realize a synchronous rectification function of a current resonant type converter which is not affected by inter-terminal voltage level detection noise, has no malfunction, and in which no reverse flow occurs.

BRIEF DESCRIPTION OF THE DRAWINGS

FIG. 8 is a diagram illustrating a relationship between an operation frequency fs and a resonance frequency fr of six operational modes, and a load condition;

FIG. 12 is a circuit diagram illustrating an operational condition in a timing s3 of the first operational mode;

FIG. 18 is a circuit diagram illustrating an operational condition in a timing s9 of the first operational mode;

FIG. 21 is a circuit diagram illustrating an operational condition in a timing s11 of the second operational mode;

FIG. 23 is a circuit diagram illustrating an Operational condition in a timing s13 of the second operational mode;

FIG. 37(A) is a diagram illustrating a control circuit of a synchronous rectification MOSFET, and FIG. 37(B) is an operation waveform diagram of each portion of the control circuit.

DETAILED DESCRIPTION OF PREFERRED EMBODIMENTS

Figure 1:
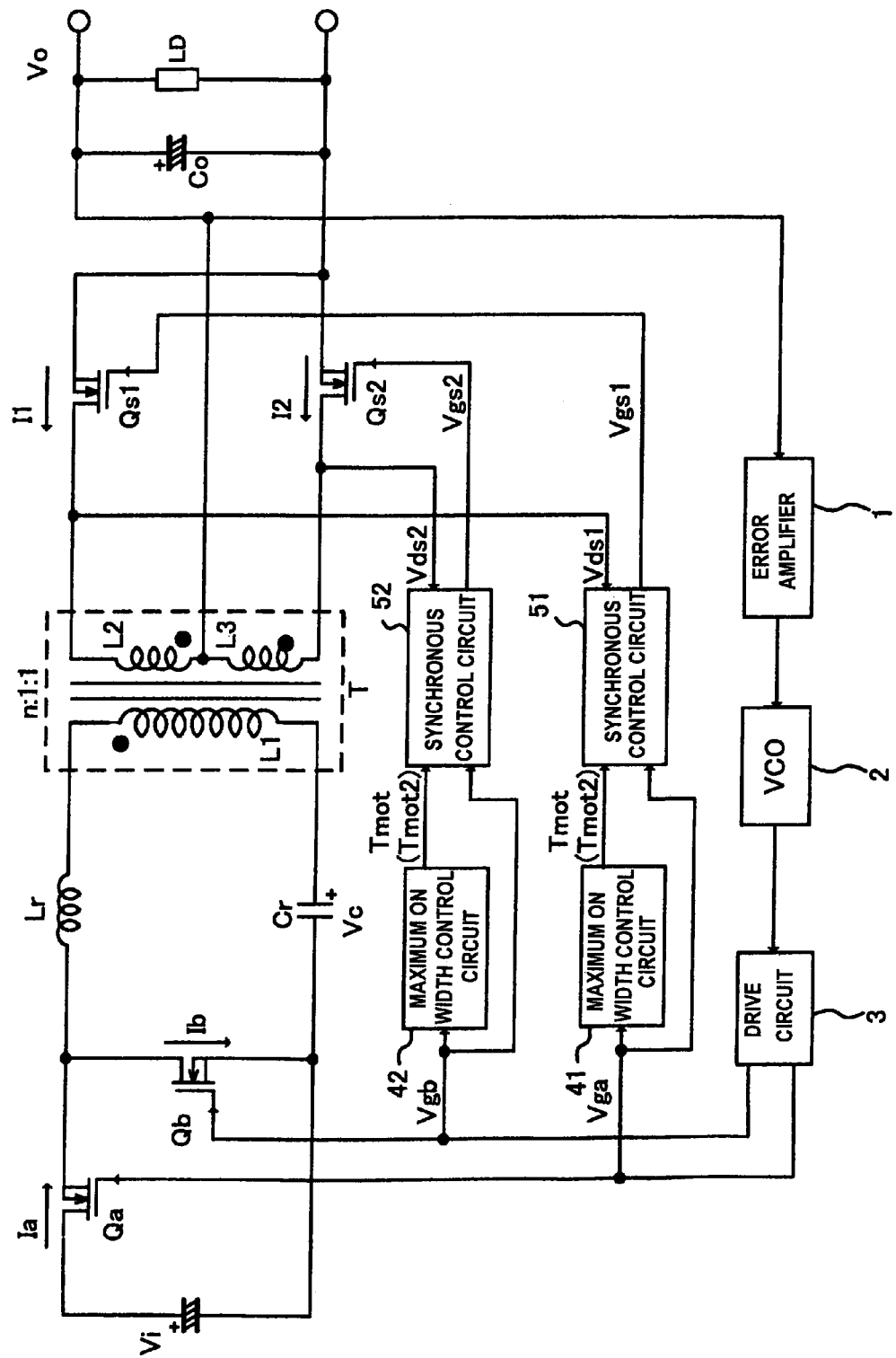
FIG. 1 is a circuit diagram illustrating an overall configuration of a switching power source device according to an embodiment.

Hereafter, referring to the drawings, a description will be given of embodiments of the invention. FIG. 1 is a circuit diagram illustrating an overall configuration of a switching power source device according to the embodiment.

The switching power source device is configured in such a way that an input direct voltage Vi is applied to a series resonant circuit which includes a resonant inductor Lr and a resonant capacitor Cr, generating a predetermined output voltage $V_0$ on a load LD via a transformer T. It is also acceptable, not providing any inductance other than the transformer T, to have the current resonant inductor Lr as leakage inductance. Alternatively, it is also acceptable to provide external inductance other than the transformer T, and configure the current resonant inductor Lr as a combination of the external inductance and leakage inductance. MOSFETs Qa and Qb are main switch elements which, by switching alternately on a primary side of the transformer T, switch a current path to the series resonant circuit. One extremity of the resonant inductor Lr is connected to one extremity of a first coil L1 of the transformer T, while the other extremity of the first coil L1 is connected to one extremity of the resonant capacitor Cr.

A second coil L2 and a third coil L3 being mutually connected in series on a secondary side of the transformer T, their connection point is connected to one extremity of an output capacitor $C_0$ and the load LD. Also, the other extremities of the second coil L2 and third coil L3 are connected to the other extremity of the ground side of the output capacitor $C_0$ and load LD via MOSFETs Qs1, Qs2 respectively. The MOSFETs Qs1, Qs2 being synchronous rectification switch elements which supply the predetermined output voltage $V_0$ to the load LD by turning on and off secondary currents 11 and 12, induced from the transformer T, in response to operations of the MOSFETs Qa, Qb, the kinds of internal diode (body diodes, or body diodes and external diodes) Ds to be described hereafter are connected in parallel to each of them.

The output voltage $V_0$ supplied to the load LD is returned to a drive circuit 3 of the MOSFETs Qa, Qb via an error amplifier 1 and a voltage control oscillation circuit (VCO) 2. At this time, gate signals Vga, Vgb, which alternately turn on and off in a predetermined timing, are generated in the drive circuit 3 and, by controlling in such a way as to send currents Ia, Ib of the MOSFETs Qa, Qb in the directions of the arrows in a predetermined timing, control a current and voltage flowing in the first coil L1 of the transformer T, and control the secondary side output voltage $V_O$ at a constant voltage. The VCO 2 functions in such a way that, when determining that due to an output of the error amplifier 1 the output voltage $V_O$ is higher than a set voltage, or is a light load, it increases an output frequency thereof, while when determining that the output voltage $V_O$ is lower than the set voltage, or is a heavy load, it reduces the output frequency thereof.

In maximum on width control circuits 41, 42, in synchronization with an on timing of the MOSFETs Qa, Qb, a maximum on width signal Tmot which is a maximum on width period H (a period other than this is low (L)), for indicating a maximum on width of a predetermined time for which the MOSFETs Qs1, Qs2 are mandatorily turned off on exceeding the period, or a maximum on width completion signal Tmot 2 which is a signal indicating a completion of the maximum on width, is generated and output to the synchronous rectification MOSFETs Qs1, Qs2. A start of the maximum on width, being indicated by the gate signals Vga, Vgb to the MOSFETs Qa, Qb, is the same as a timing in which the gate signals Vga, Vgb become H, and the MOSFETs Qa, Qb are turned on. Then, in synchronous control circuits 51, 52, which actually generate synchronous drive signals Vgs 1, Vgs 2 of the synchronous rectification MOSFETs Qs1, Qs2, a timing of the MOSFETs Qs1, Qs2 being turned on is decided synchronized with a timing indicating the start of the maximum on width (that is, a timing of the maximum on width signal Tmot changing from L to H), or a timing of a conduction of the internal diodes Ds detected by drain-to-source voltages Vds1 and Vds2 of the MOSFETs Qs1, Qs2, whichever timing is later, and furthermore, a timing of the MOSFETs Qs1, Qs2 being turned off is decided synchronized with an off timing of the MOSFETs Qa, Qb, or a timing of indicating the completion of the maximum on width, whichever timing is earlier.

Next, a description will be given of a control circuit (a switching power source control circuit) of the switching power source device shown in FIG. 1.

Figure 2:
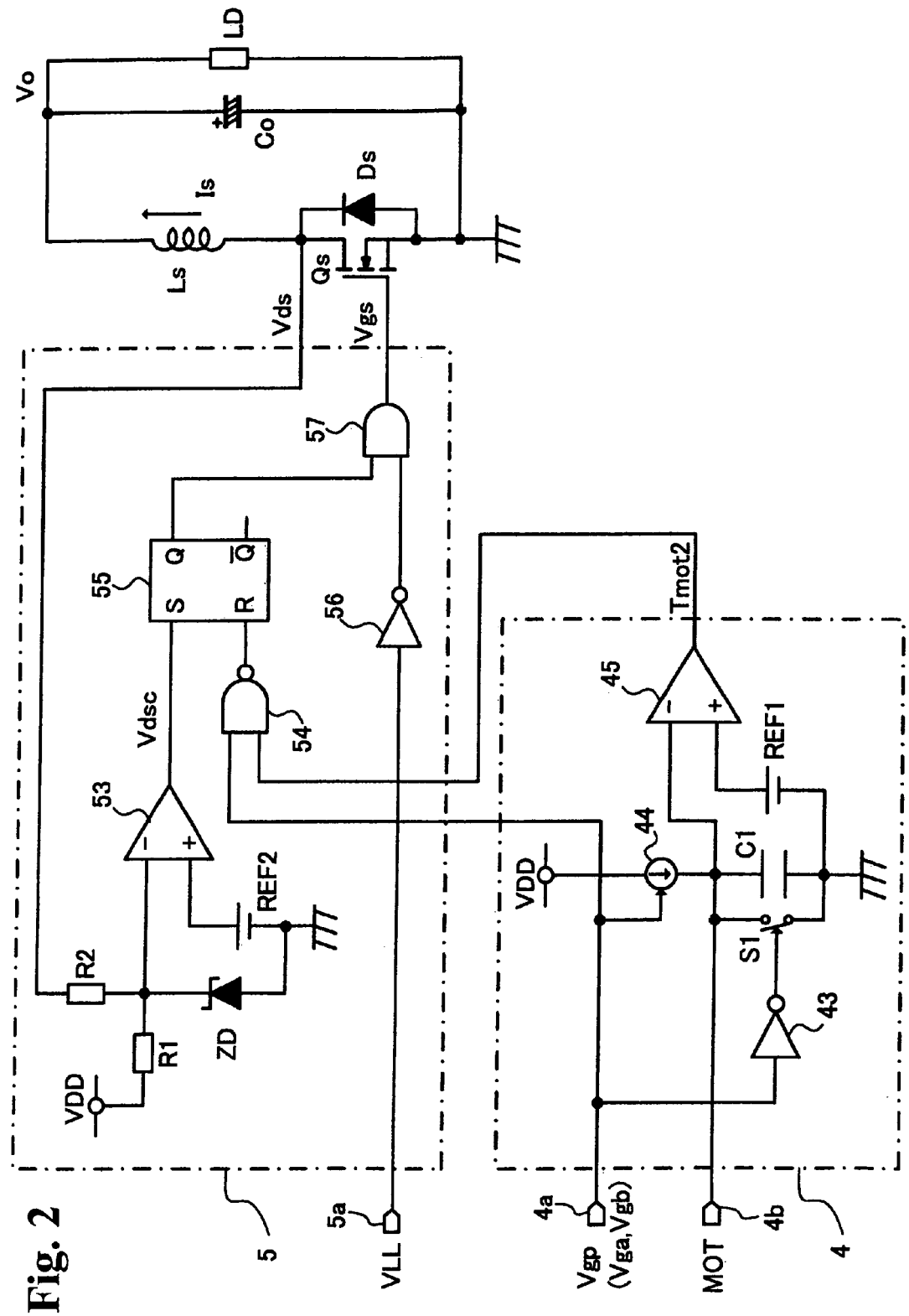
FIG. 2 is a circuit diagram illustrating a maximum on width control circuit and a synchronous control circuit of the switching power source device.

FIG. 2 is a circuit diagram illustrating a maximum on width control circuit and synchronous control circuit of the switching power source device. Herein, the synchronous control circuit 5 is illustrated representing either one of the synchronous control circuits 51, 52. Also, with regard to the maximum on width control circuits 41 and 42, by configuring them of a one-shot multivibrator which adjusts its pulse width by means of an external part connected to an MOT terminal, the maximum on width control circuits 41, 42 can realize an embodiment which outputs the maximum on width signal Tmot, and this is taken as a first embodiment. However, as the one-shot multivibrator itself is commonly known, any further description relating to the first embodiment will be omitted. Herein, a description will be given of a second embodiment realized by the maximum on width control circuit 4 which operates in conformity with the first embodiment. The maximum on width control circuit 4 illustrated in FIG. 2 is illustrated representing either one of the maximum on width control circuits 41 or 42. Also, in the case of realizing the maximum on width control circuits 41, 42 with a one-shot multivibrator too, it is possible to use the same synchronous control circuit 5. Also, the internal diodes Ds are connected in parallel to a drain-to-source of a synchronous rectification MOSFET Qs, which controls a secondary current Is of either one of the second coil L2 or third coil L3 (described as Ls in FIG. 2) on the secondary side of the transformer T.

The maximum on width control circuit 4 includes a gate signal input terminal 4a, to which either one of the gate signals Vga or Vgb (hereafter described simply as a gate signal Vgp) is supplied from the drive circuit 3 shown in FIG. 1, and an MOT terminal 4b, to which is connected an external part for adjusting the size of the maximum on width (corresponding to the pulse width of the maximum on width signal Tmot, which is the output of the one-shot multivibrator when using the one-shot multivibrator). The maximum on width control circuit 4 is a circuit which, rather than outputting the maximum on width signal Tmot itself, outputs the maximum on width completion signal Tmot 2 indicating the timing of the completion of the maximum on width. The maximum on width control circuit 4 is configured of an inverter 43 connected to the gate signal input terminal 4a, a constant current source 44 connected to a power source voltage VDD, a capacitor C1, of which one extremity is connected to the constant current source 44 and the other extremity is grounded, a switch S1, which is on-off controlled by the inverter 43 in such a way as to control a charge and discharge of the capacitor C1, and a comparator 45 which compares a charging voltage to the capacitor C1 with a reference voltage REF 1.

In the maximum on width control circuit 4, on the switch S1 being turned off by the gate signal Vgp of the gate signal input terminal 4a, the current from the constant current source 44 starts to charge the capacitor C1. Then, in a timing in which the voltage of an inverting input terminal (−) of the comparator 45 exceeds the reference voltage REF 1 to a non-inverting input terminal (+), the maximum on width completion signal Tmot 2, which is the output of the comparator 45, reverses from H (high) to L (low), and communicates the completion of the maximum on width to the synchronous control circuit 5. On the maximum on width completion signal Tmot 2 becoming L, the output of a negative AND (NAND) circuit 54 of the synchronous control circuit 5 becomes H, resetting a flip-flop circuit 55. Subsequently, on the switch S1 being turned on by the gate signal Vgp, the capacitor C1 is discharged, and the maximum on width completion signal Tmot 2 becomes H. The start of the maximum on width signal Tmot being in the timing in which the gate signal Vgp becomes H, as heretofore described, the gate signal Vgp is input into the NAND circuit 54 connected to a reset terminal of the flip-flop circuit 55, by which means the maximum on width control circuit 4 of the second embodiment can indicate the start of the maximum on width (the completion of the resetting of the flip-flop circuit 55). Consequently, in the second embodiment too, it is possible to indicate the same timing for the start and completion of the maximum on width as with the maximum on width signal Tmot when using the one-shot multivibrator of the first embodiment, because of which it is possible to set a maximum on width having an optimum on width.

A resistor, a capacitor, or the like is connected to the MOT terminal 4b for adjusting the output timing of the maximum on width completion signal Tmot 2, output from the comparator 45, in accordance with a resonance frequency fr1. In the case of connecting a resistor, the current from the constant current source 44 is split by the resistor, and it is possible to delay the output timing of the maximum on width completion signal Tmot 2 in accordance with a resistance value of the resistor. Also, in the case of connecting a capacitor, it is equivalent to a capacity value of the capacitor C1 increasing, because of which it is possible to delay the output timing of the maximum on width completion signal Tmot 2.

Herein, as a logical product (a negative thereof) of the gate signal Vgp and maximum on width completion signal Tmot 2 is taken in the NAND circuit 54, the flip-flop circuit 55 is reset in either the timing in which the maximum on width completion signal Tmot 2 becomes L, or the timing in which the on period of the gate signal Vgp is completed, and the gate signal Vgp becomes L, whichever is earlier.

The synchronous control circuit 5 is a circuit which, including a signal input terminal 5a to which is supplied a very light load condition signal VLL which becomes H when a very light load is detected by a circuit (not shown), and furthermore, to which are supplied the drain-to-source voltage Vds from the synchronous rectification MOSFET Qs, the maximum on width signal Tmot or the maximum on width completion signal Tmot 2 output from the maximum on width control circuit 4, and the gate signal Vgp which on-off controls the MOSFETs Qa, Qb, controls an on period of the MOSFET Qs by outputting the synchronous drive signal Vgs. The synchronous control circuit 5 is configured of a comparator 53 which, based on a reference voltage REF 2, outputs a level detection signal Vdsc from the drain-to-source voltage Vds, the NAND circuit 54, which computes NAND signals of the maximum on width signal Tmot and gate signal Vgp, the flip-flop circuit 55, in which the level detection signal Vdsc of the comparator 53 and the NAND signals of the NAND circuit 54 are supplied to a set terminal S and a reset terminal R respectively, and an AND circuit 57, into which are input a Q output signal of the flip-flop circuit 55, and a signal which is the very light load condition signal VLL to the signal input terminal 5a inverted by an inverter 56.

In the synchronous control circuit 5, an inverting input terminal (−) of the comparator 53, as well as being grounded via a Zener diode ZD, is connected to the power source voltage VDD via a resistor R1, and furthermore, is connected to a drain terminal of the synchronous rectification MOSFET Qs via a resistor R2. The reference voltage REF 2 of the comparator 53 is applied to a non-inverting input terminal (+).

Now, taking the power source voltage VDD to be A, and a threshold value voltage (Vds_th) which is the MOSFET Qs drain-to-source voltage Vds when the level detection signal Vdsc, which is the output of the comparator 53, inverts to be X, as the two inputs of the comparator 53 are equal when Vds=X, the following expression holds true. The above mentioned threshold value voltage (Vds_th) is different from a threshold value relating to an on-off of the MOSFET Qs.

$(A-X)*(R2/(R1+R2))+X=REF2$ $\therefore (A-X)+X*(1+R1/R2)=REF2*(1+R1/R2)$ $\therefore X*(R1/R2)=(1+R1/R2)*REF2-A$ Consequently, the MOSFET Qs drain-to-source voltage threshold value voltage (Vds_th) when the level detection signal Vdsc inverts is, Expression 3

$$Vds\_th = -VDD\frac{R2}{R1} + REF2\left(1 + \frac{R2}{R1}\right) \quad (5)$$

When the drain-to-source voltage Vds exceeds (Vds_th) (strictly speaking, when both are negative values, and an absolute value of Vds is greater than an absolute value of (Vds_th)), the level detection signal Vdsc, which is the output of the comparator 53, inverts from L to H. Incidentally, in a condition in which no current is flowing in the drain-to-source, the value of the drain-to-source voltage Vds is positive, and the level detection signal Vdsc is L. While the level detection signal Vdsc of the drain-to-source voltage Vds is supplied as a set signal of the flip-flop circuit 55, an output signal of the NAND circuit 54, into which are input the gate signal Vgp, and the maximum on width signal Tmot or maximum on width completion signal Tmot 2, is taken to be a reset signal of the flip-flop circuit 55. Also, the Q output signal of the flip-flop circuit 55 being supplied to the AND circuit 57 along with the inverted very light load condition signal VLL output from the inverter 56, the output signal is taken to be the gate drive signal Vgs of the synchronous rectification MOSFET Qs. The flip-flop circuit 55 is a reset prioritizing circuit. That is, when the gate signal Vgp is in the L condition before indicating the start of the maximum on width, it is not possible to set the flip-flop circuit 55, even in the event that the drain-to-source voltage Vds exceeds (Vds_th). Because of this, it is possible to prevent a malfunction which may occur in a dead time set in the primary side gate signals Vga, Vgb.

Next, a description will be given of a control method of the switching power source device.

Figure 3:
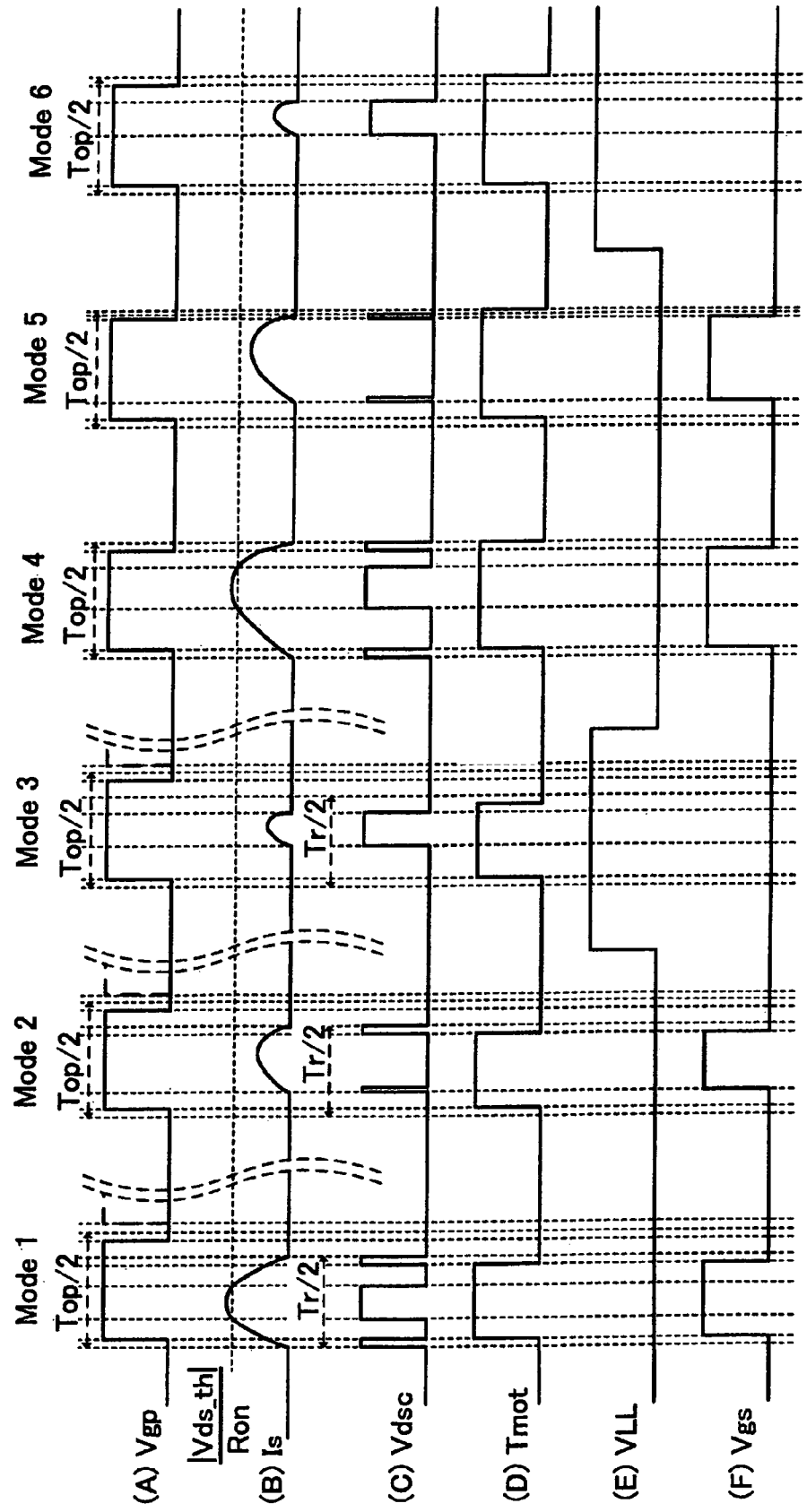
FIG. 3 is a timing diagram illustrating a secondary side current control operation by the synchronous control circuit of FIG. 2.

FIG. 3 is a timing diagram illustrating a secondary side current control operation by the synchronous control circuit of FIG. 2. Herein, a description is given of a case in which the maximum on width control circuits 41, 42 are realized with a one-shot multivibrator. In (A) of FIG. 3, the gate signal Vgp from the drive circuit 3 shown in FIG. 1 is shown for six operational modes, Modes 1 to 6, lined along the same time axis. (B) of FIG. 3 shows the secondary current Is flowing in the synchronous rectification MOSFET Qs compared with an absolute value (|Vds_th|) of the MOSFET Qs drain-to-source voltage when the level detection signal Vdsc inverts converted into a current by dividing by an on resistance Ron of the MOSFET Qs. Also, the threshold value voltage Vds_th can be calculated using the heretofore described Expression 5. Alternatively, it is also possible to decide the voltage Vds_th first, and adjust other parameters using the Expression 5.

In (C) of FIG. 3, a waveform of the level detection signal Vdcs is shown. The |Vds_th|/Ron shown in (B) of FIG. 3 shows a level of the secondary current Is for which the level detection signal Vdsc output from the comparator 53 is H. Also, (D) of FIG. 3 is the maximum on width signal Tmot, (E) of FIG. 3 the very light load condition signal VLL, and (F) of FIG. 3 the synchronous drive signal Vgs output from the synchronous control circuit 5.

In the first operational mode (Mode 1), the synchronous drive signal Vgs turns off the MOSFET Qs in synchronization with the timing in which the gate signal Vgp is turned off, or the timing in which the maximum on width signal Tmot indicates off, whichever timing is earlier. For this reason, it is possible to reliably prevent a reverse flow in a Range A which has heretofore occurred in a latter half of a half cycle (Top/2) of a switching operation.

Figure 32:
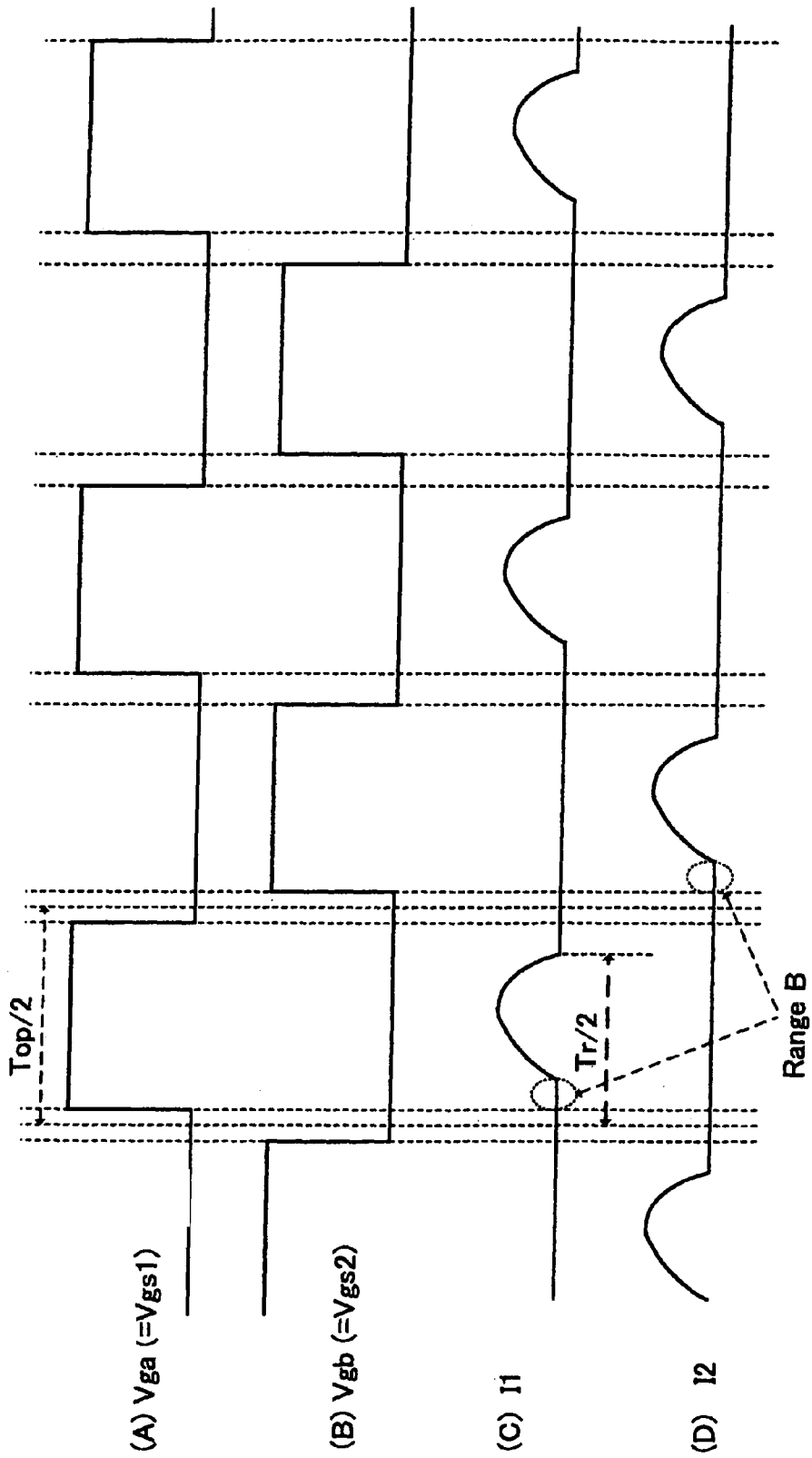
FIG. 32 is a diagram illustrating a secondary side current waveform induced via a transformer in the second operational mode.
Figure 35:
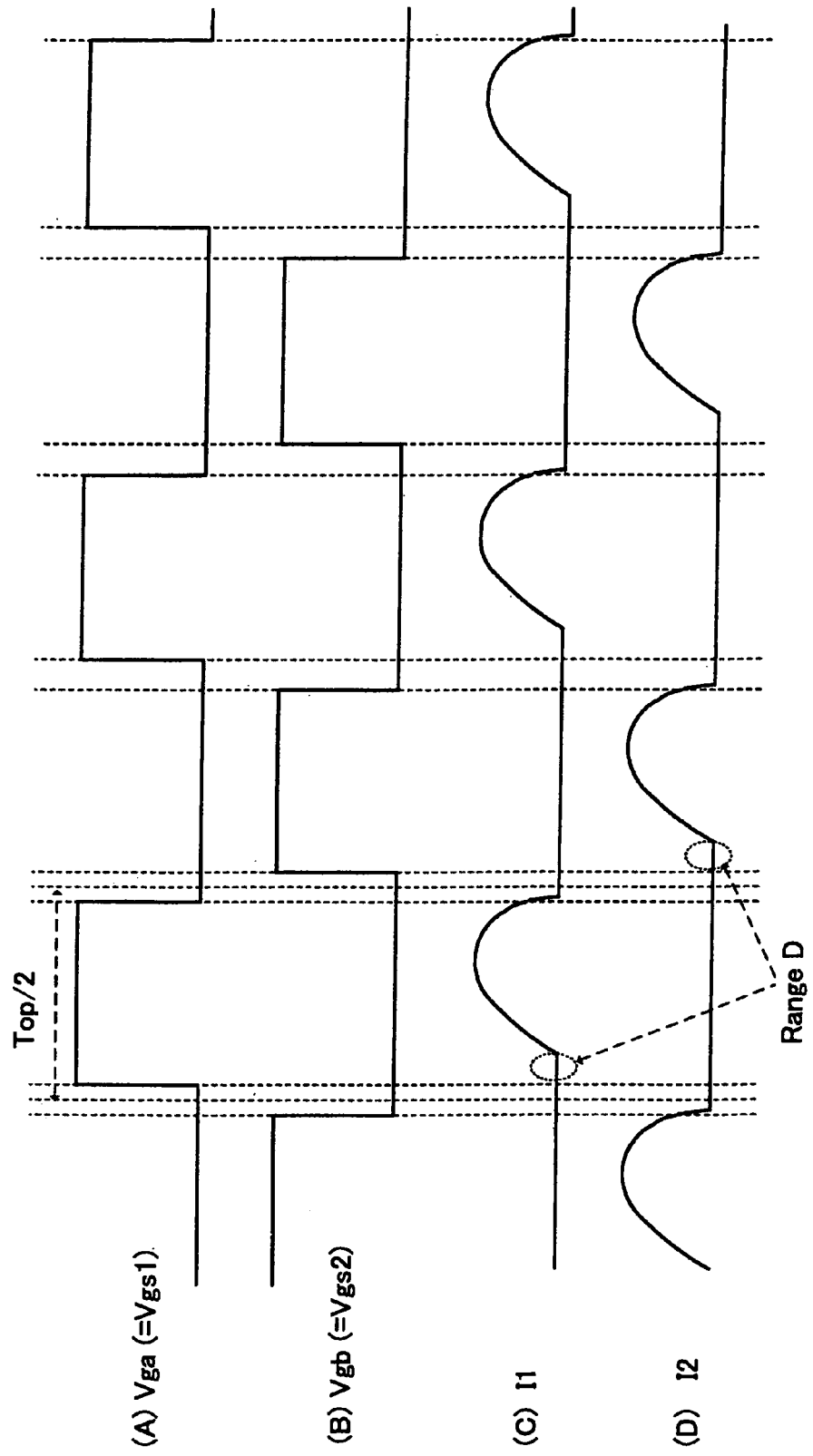
FIG. 35 is a diagram illustrating a secondary side current waveform induced via a transformer in the fifth operational mode.

In the second and fifth operational modes (Modes 2 and 5), the synchronous drive signal Vgs turning on the MOSFET Qs in synchronization with the timing in which the maximum on width signal Tmot indicates on, or the timing in which the conduction of the internal diodes Ds detected by the level detection signal Vdsc of the drain-to-source voltage Vds, whichever timing is later, it is also possible to reliably prevent a reverse flow in a Range B (FIG. 32) or a Range D (FIG. 35) which has heretofore occurred in a first half of a half cycle (Top/2) of the switching operation. Also, once the MOSFET Qs has been turned on, a fluctuation of the drain-to-source voltage Vds is ignored. Consequently, there is no occurrence of the phenomenon seen in the configuration of Patent Document 2 wherein a high frequency oscillation is invariably repeated every time the secondary current Is decreases to zero.

Figure 33:
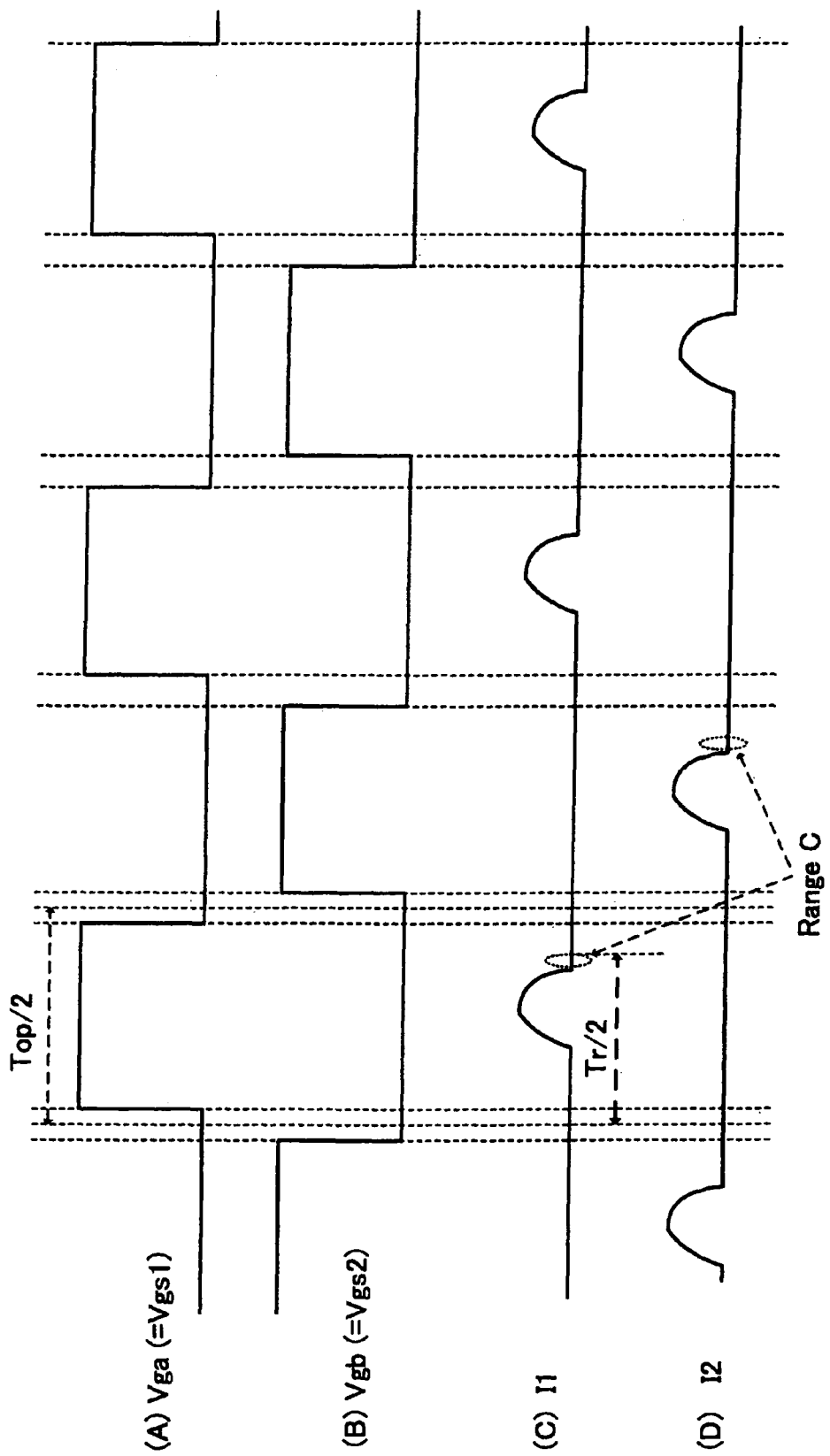
FIG. 33 is a diagram illustrating a secondary side current waveform induced via a transformer in the third operational mode.
Figure 34:
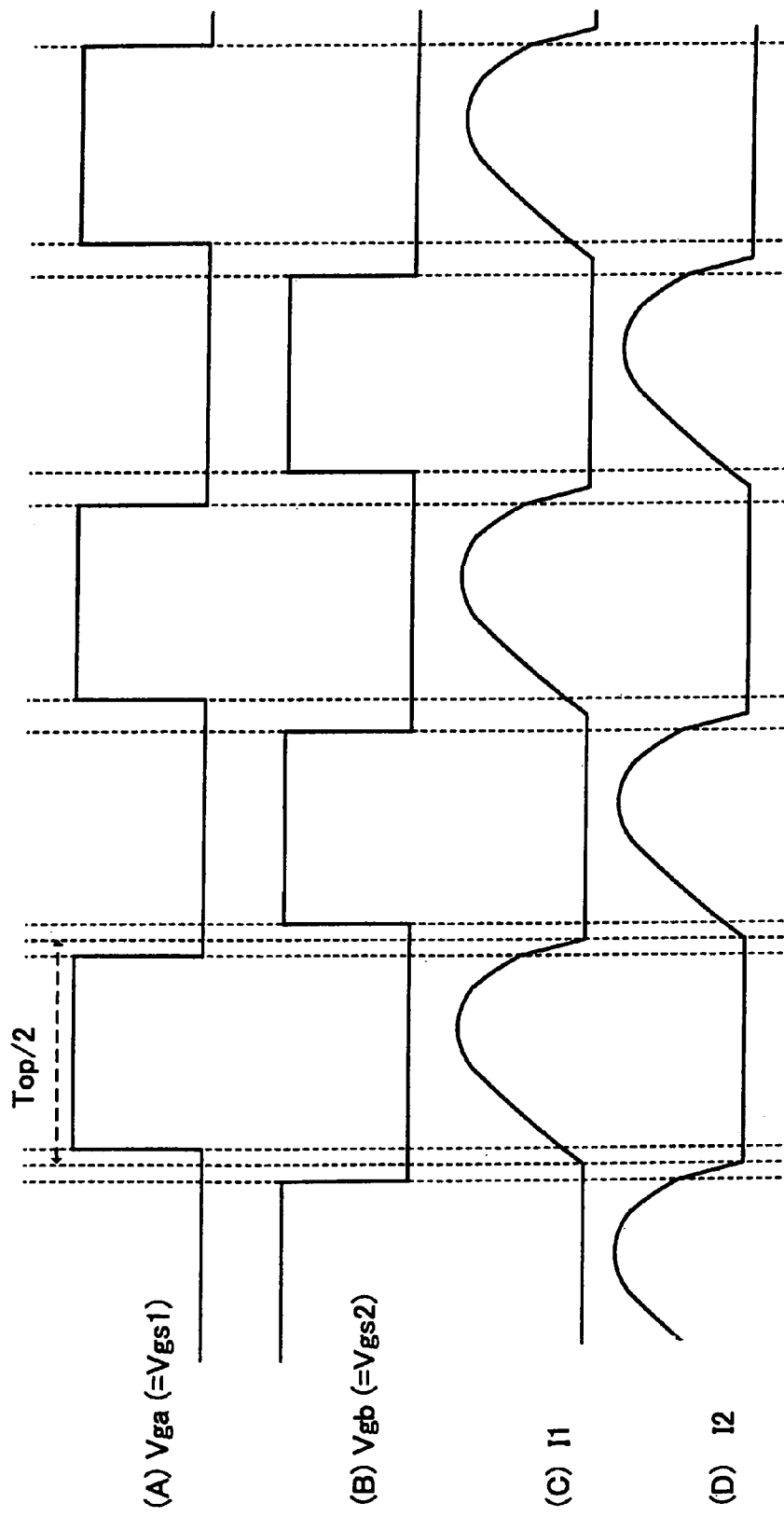
FIG. 34 is a diagram illustrating a secondary side current waveform induced via a transformer in the fourth operational mode.
Figure 36:
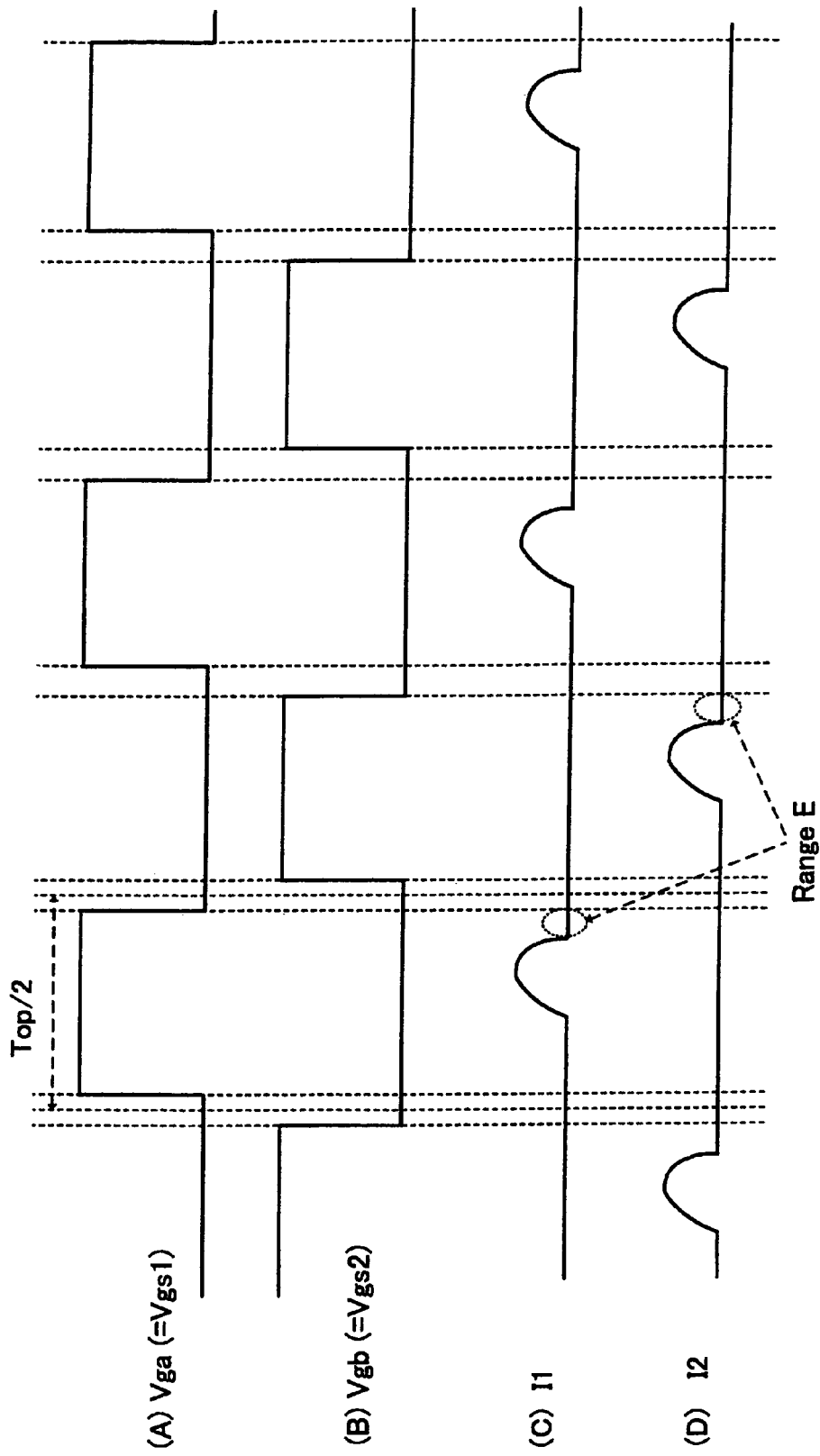
FIG. 36 is a diagram illustrating a secondary side current waveform induced via a transformer in the sixth operational mode.
Figure 37B:
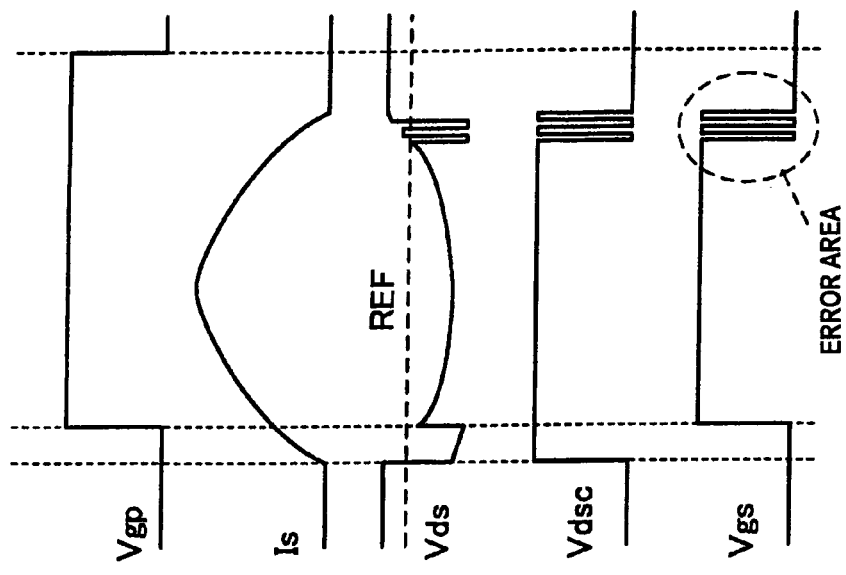
FIGS. 37(A) and 37(B) being diagrams for illustrating problem areas of heretofore known technology.
Figure 37A:
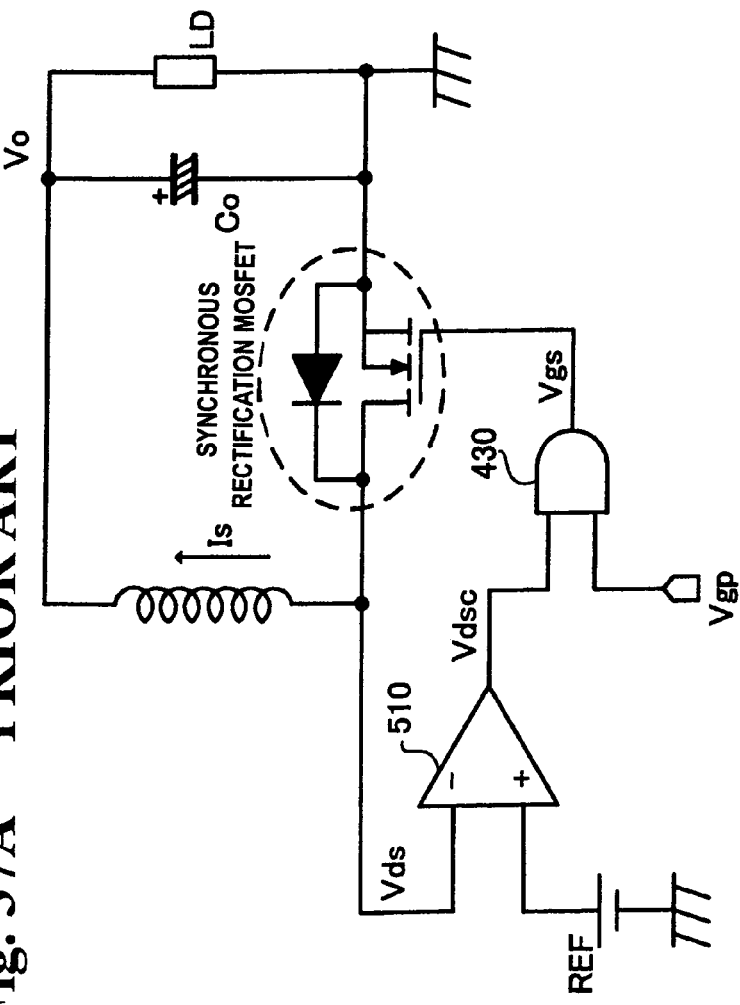

Also, as the very light load condition of the load LD is detected by the very light load condition signal VLL, the synchronous drive signal Vgs is not output from the synchronous control circuit 5 in the third and sixth operational modes (Modes 3 and 6). For this reason, the MOSFET Qs not being turned on in the very light load condition, it is also possible to reliably prevent a reverse flow which has heretofore occurred in a Range C (FIG. 33) or a Range E (FIG. 36). The very light load condition signal VLL has been defined as a case in which the load LD actually connected is 20% or less of a rated load (maximum load) of the switching power source device, but the setting of this ratio can be changed as appropriate.

As heretofore described, as it is possible to supply the synchronous drive signal Vgs to the synchronous rectification MOSFET Qs with the kind of timing shown in FIG. 3, a stable synchronous rectification function is realized, with no reverse current occurring, in the case of any of the first to sixth operational modes.

In the heretofore described embodiments, a description is given of a half bridge type of switching power source device, but the invention is also applicable to a full bridge type of switching power source device or switching power source control circuit, and to a control method of the full bridge type of switching power source device.

Figure 4:
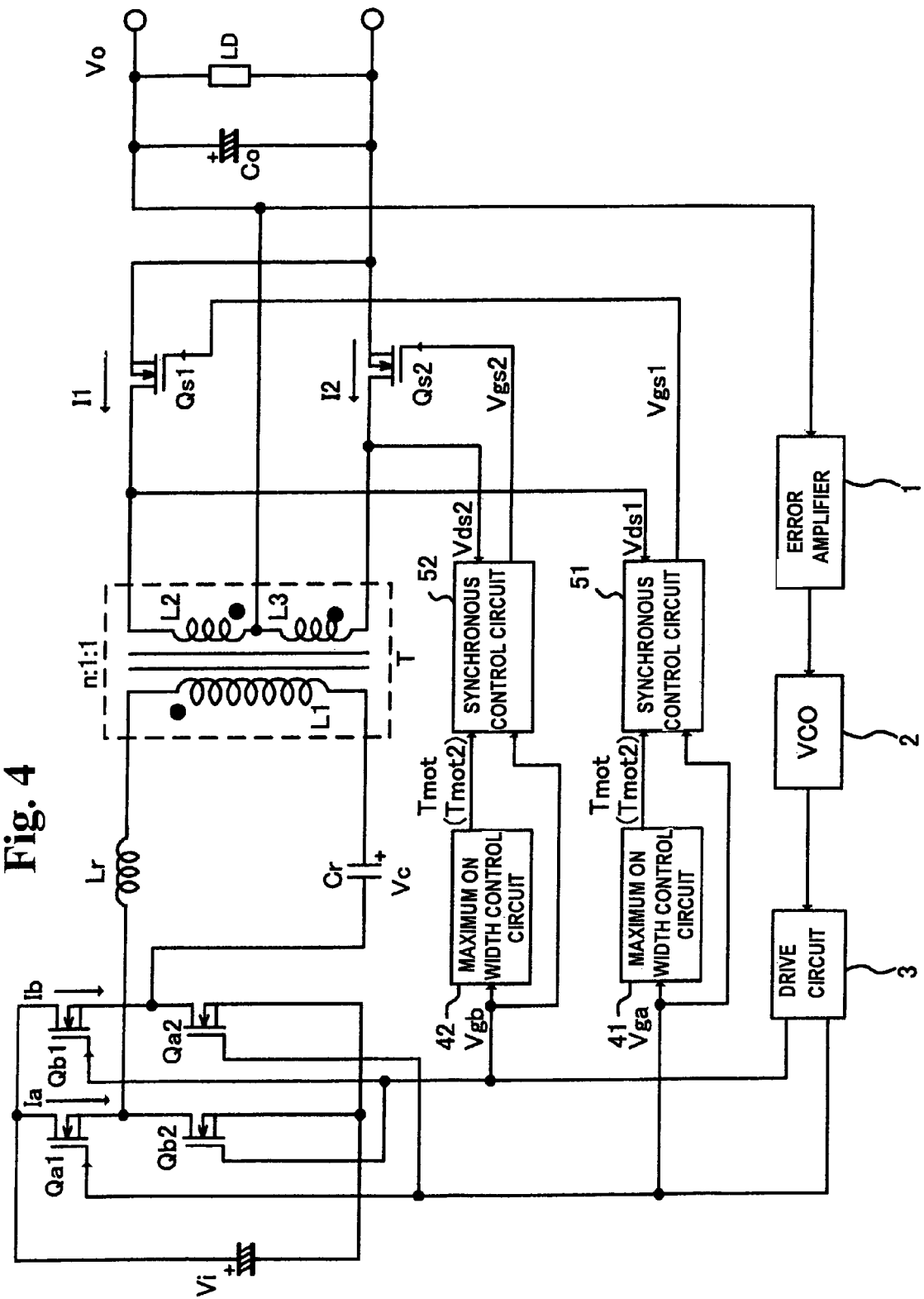
FIG. 4 is a circuit diagram illustrating an overall configuration of a full bridge type of switching power source device.
Figure 5:
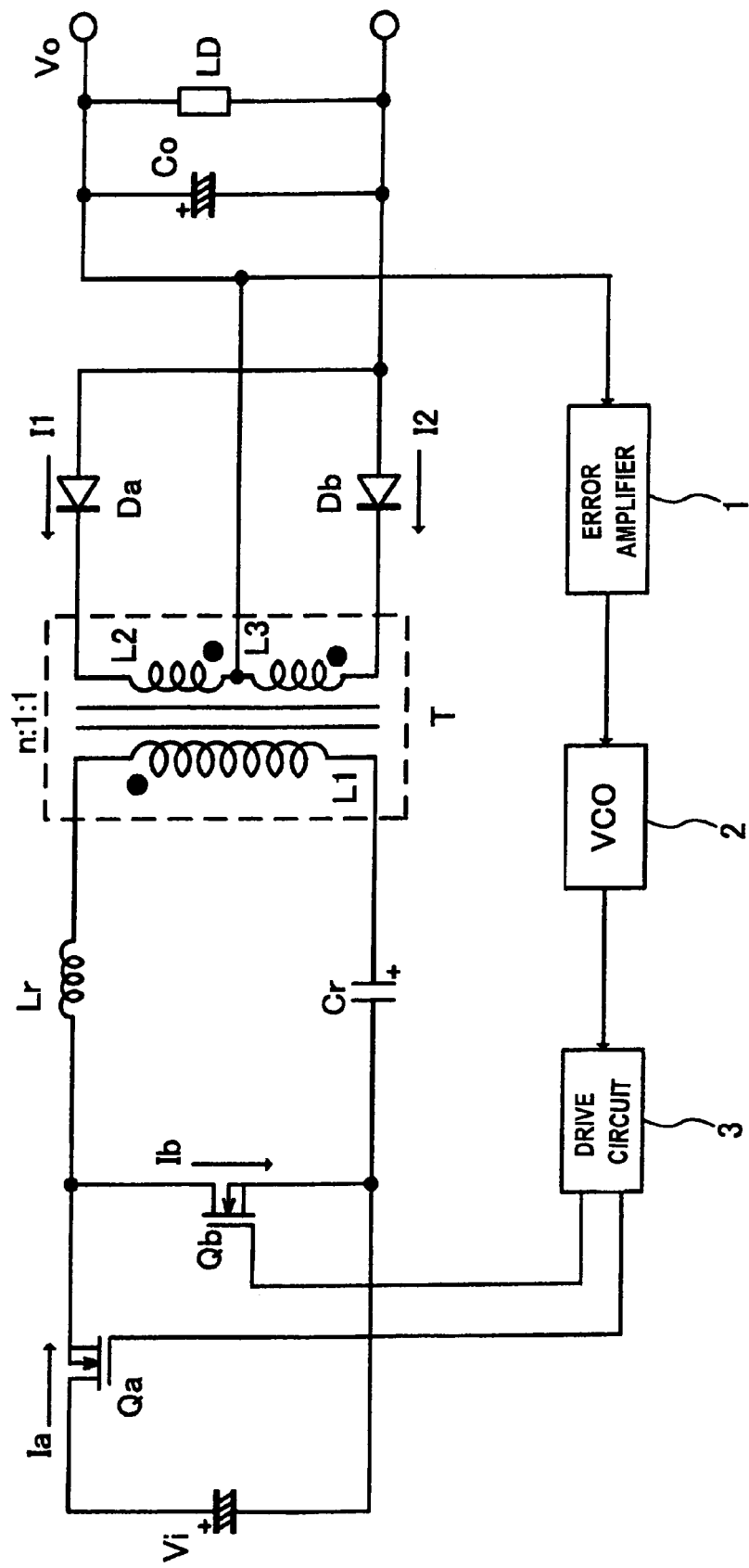
FIG. 5 is a circuit diagram illustrating one example of a conventional current resonant type converter.
Figure 6:
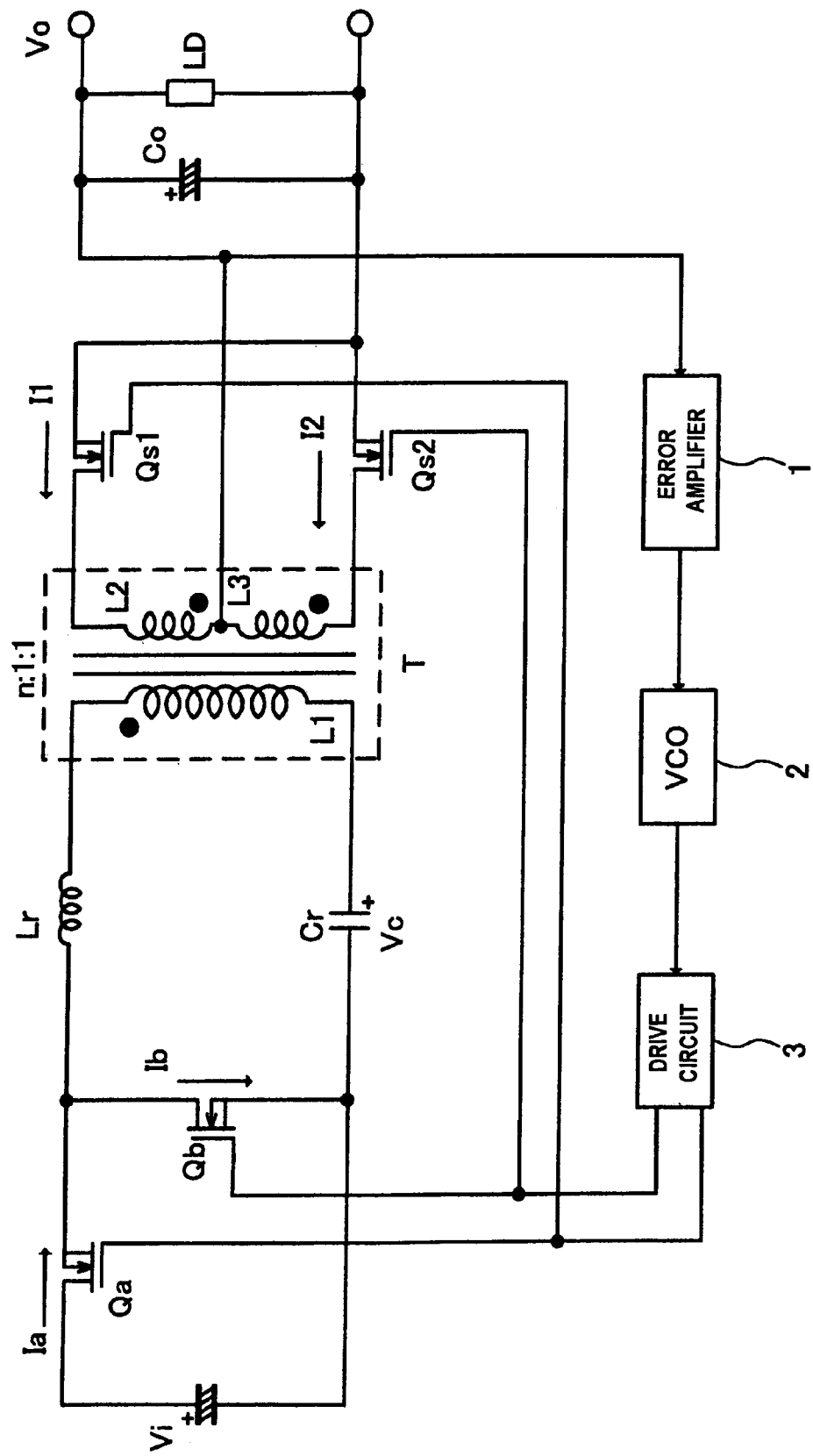
FIG. 6 is a diagram illustrating the current resonant type converter in which a rectification diode of FIG. 5 is replaced with a MOSFET.
Figure 7:
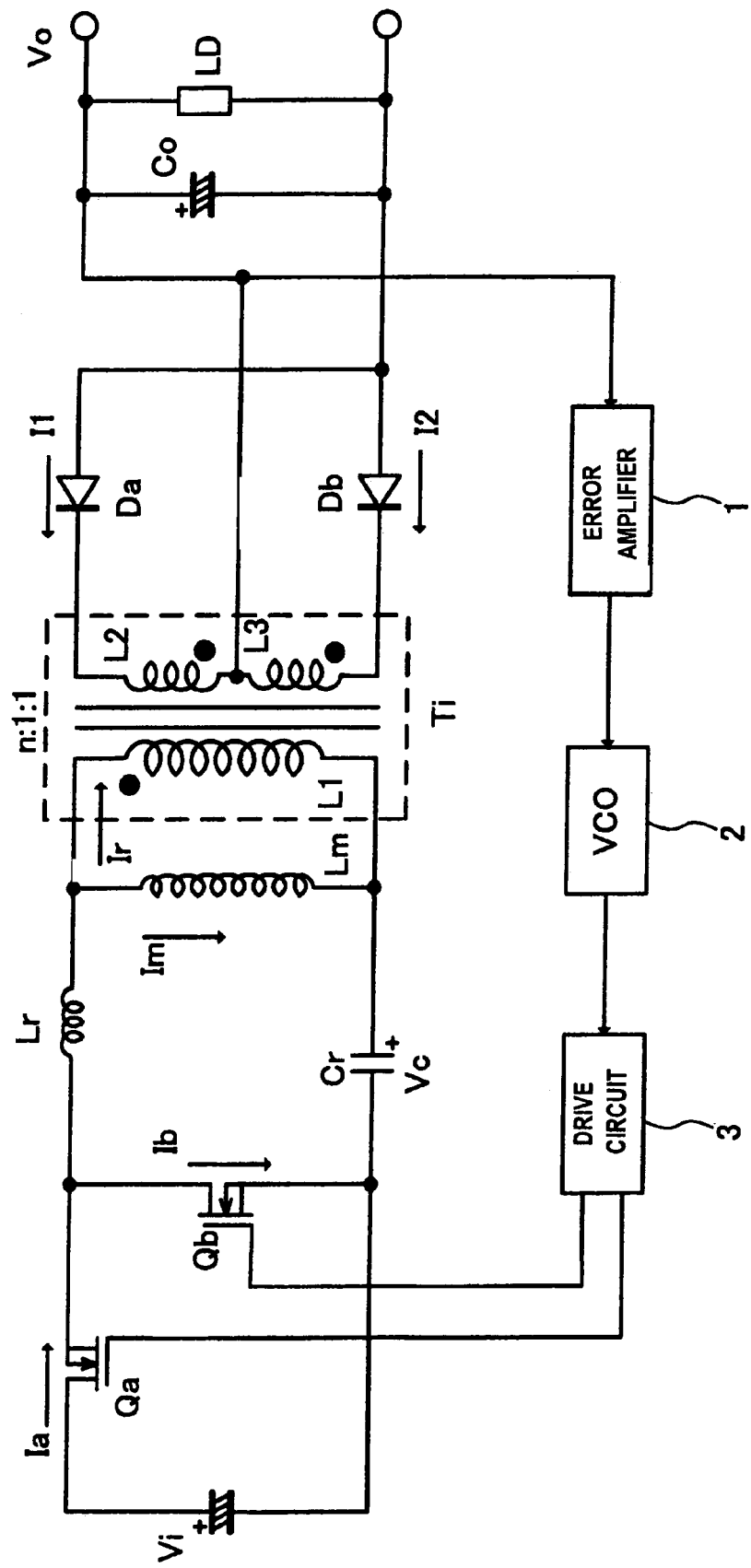
FIG. 7 is a circuit diagram illustrating one example of the current resonant type converter of a secondary side diode rectification.
Figure 9:
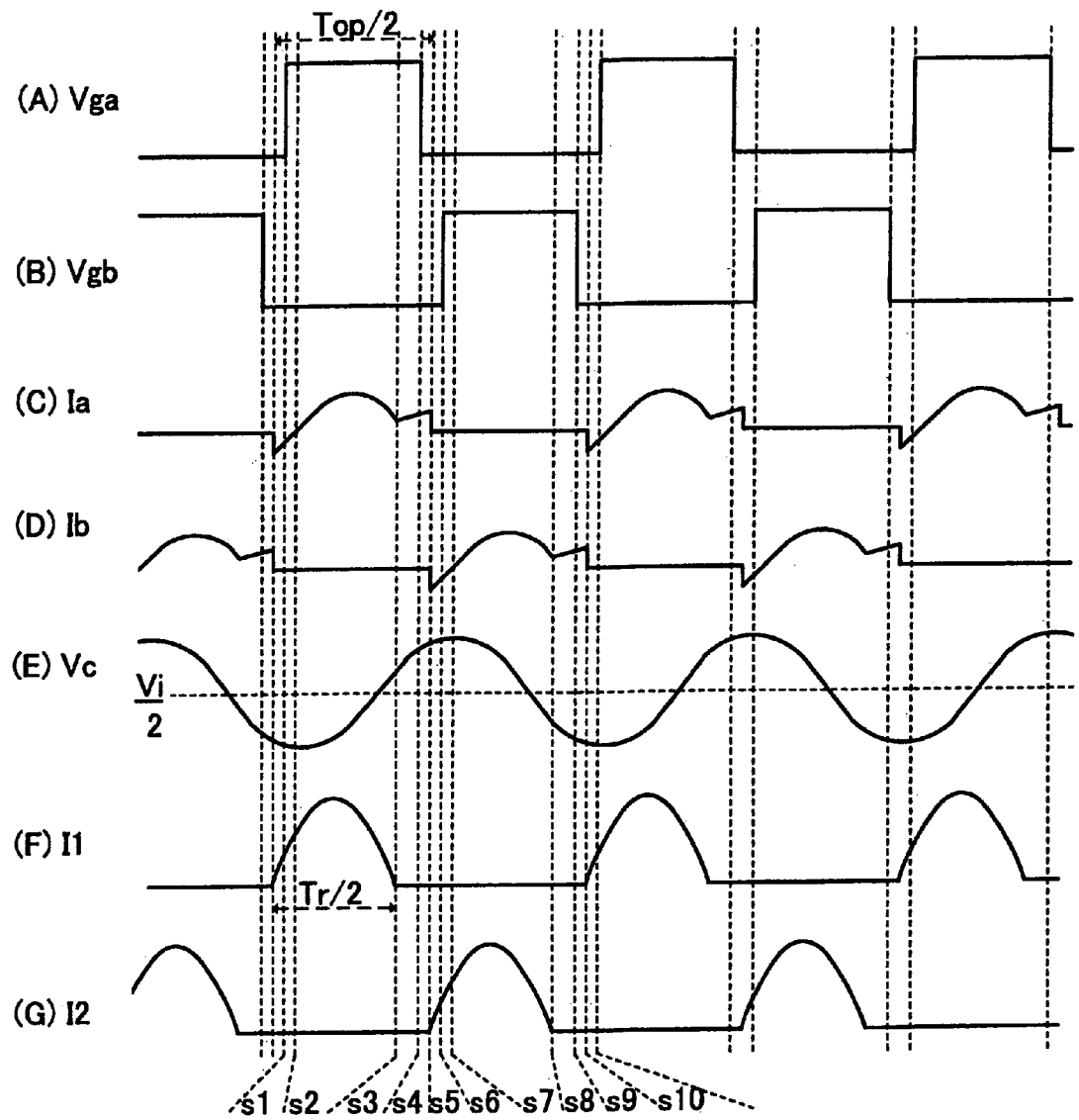
FIG. 9 is an operation waveform diagram illustrating a current and voltage waveform of each portion in a first operational mode of the current resonant type converter.
Figure 10:
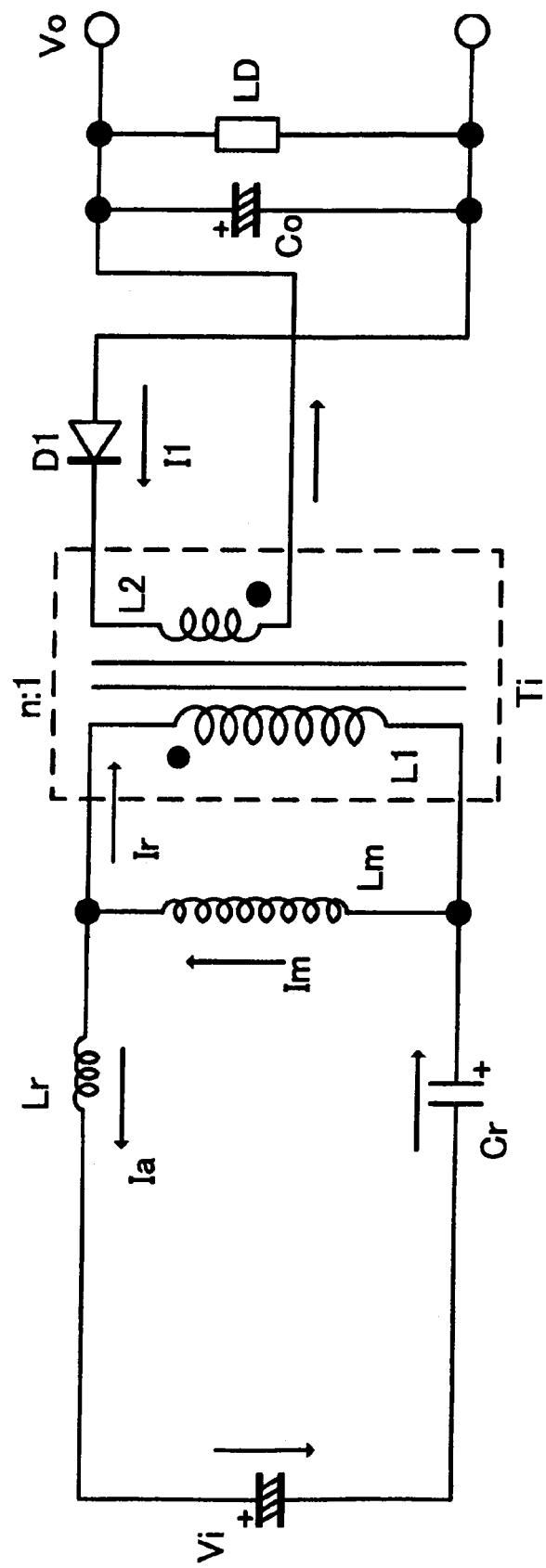
FIG. 10 is a circuit diagram illustrating an operational condition in a timing s1 of the first operational mode.
Figure 11:
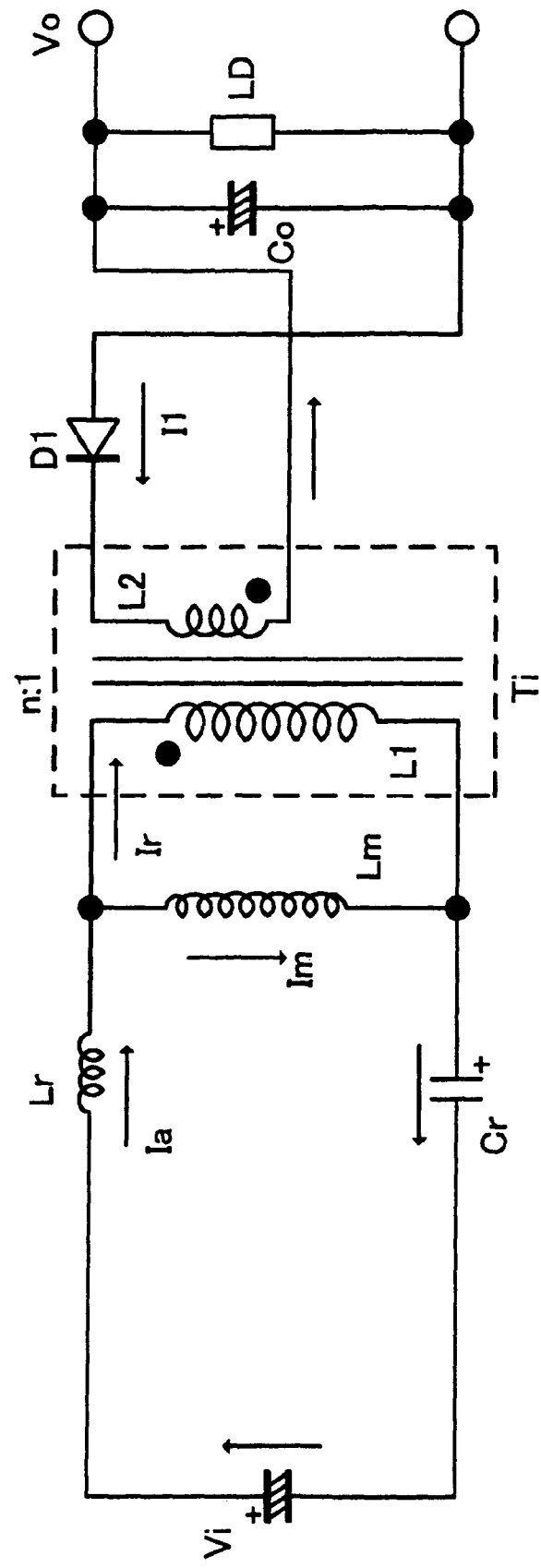
FIG. 11 is a circuit diagram illustrating an operational condition in a timing s2 of the first operational mode.
Figure 13:
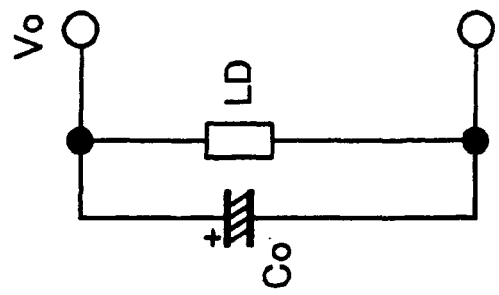
FIG. 13 is a circuit diagram illustrating an operational condition in a timing s4 of the first operational mode.
Figure 13:
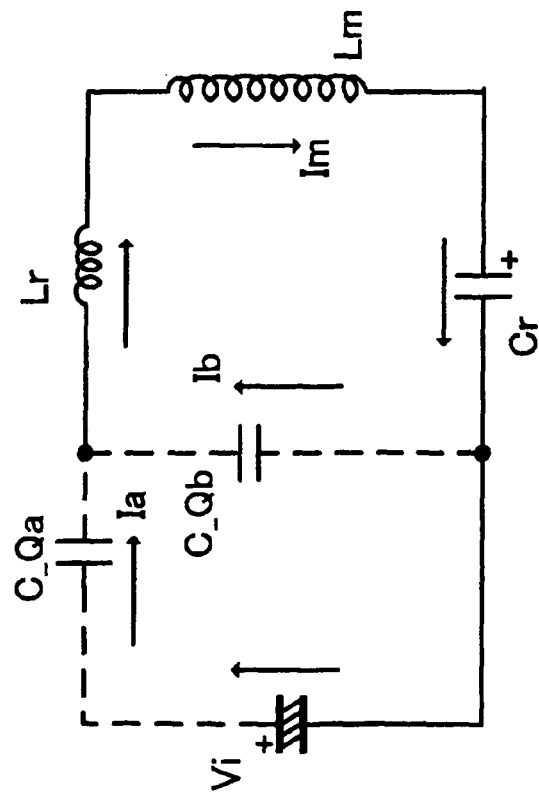
Figure 14:
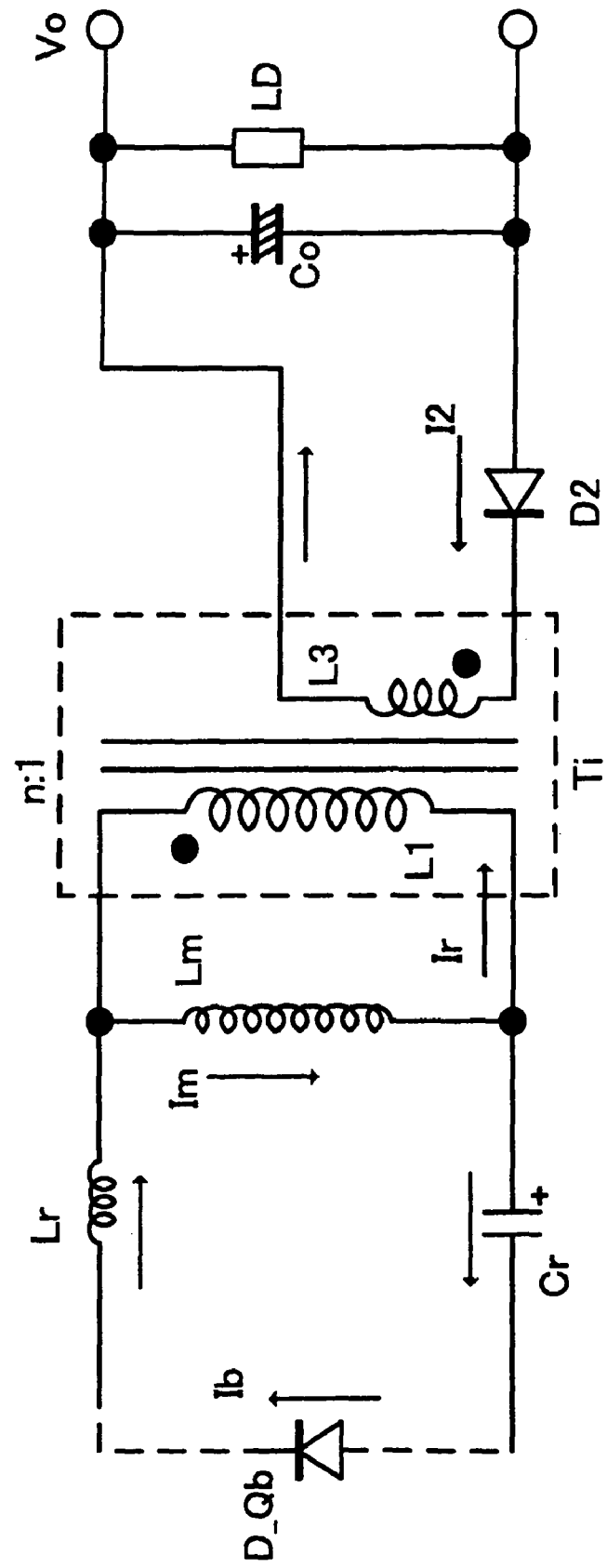
FIG. 14 is a circuit diagram illustrating an operational condition in a timing s5 of the first operational mode.
Figure 15:
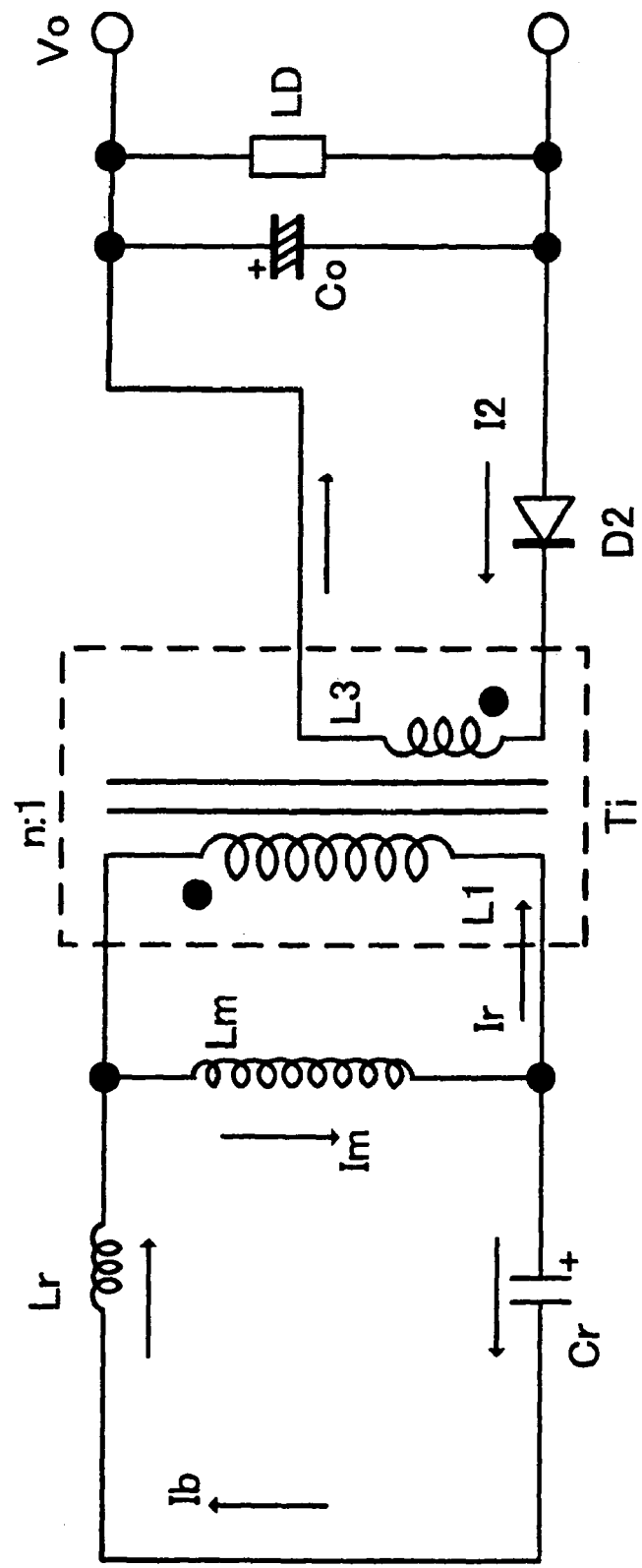
FIG. 15 is a circuit diagram illustrating an operational condition in a timing s6 of the first operational mode.
Figure 16:
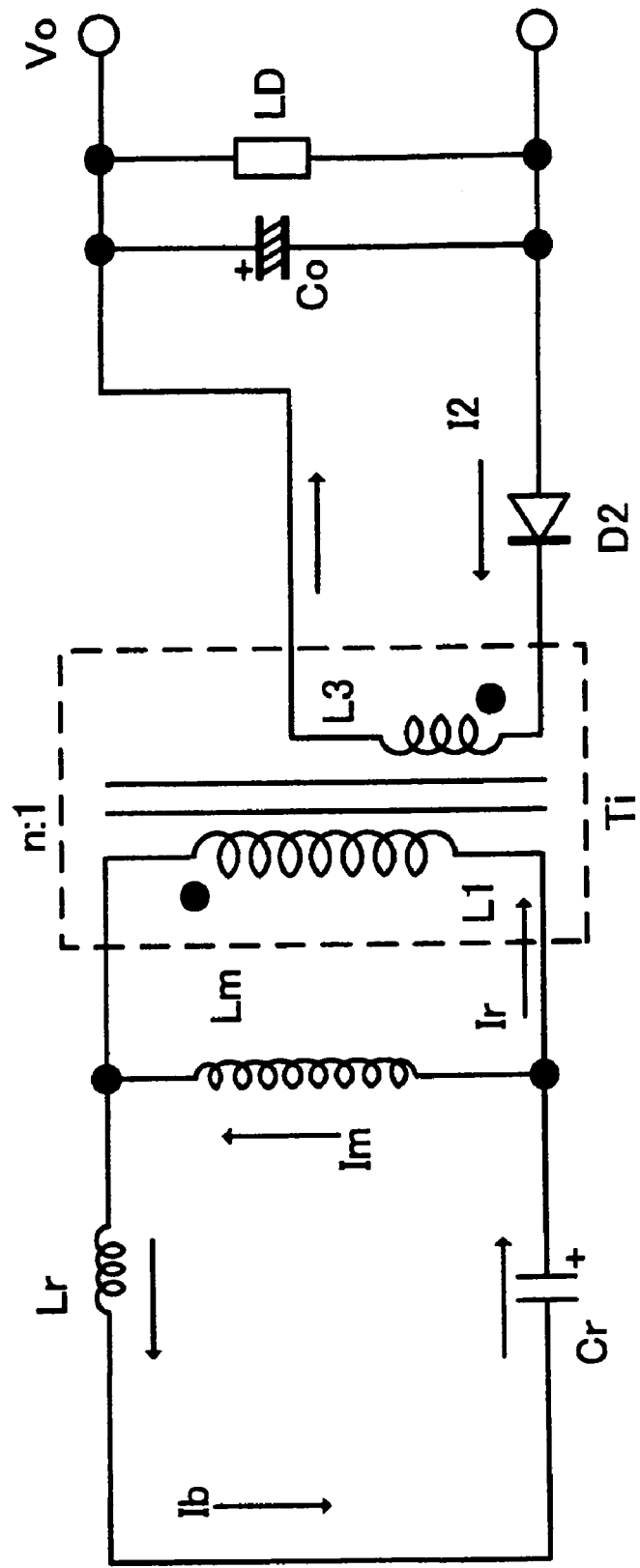
FIG. 16 is a circuit diagram illustrating an operational condition in a timing s7 of the first operational mode.
Figure 17:
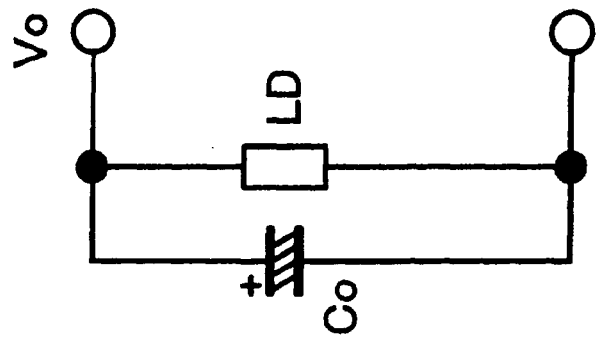
FIG. 17 is a circuit diagram illustrating an operational condition in a timing s8 of the first operational mode.
Figure 17:
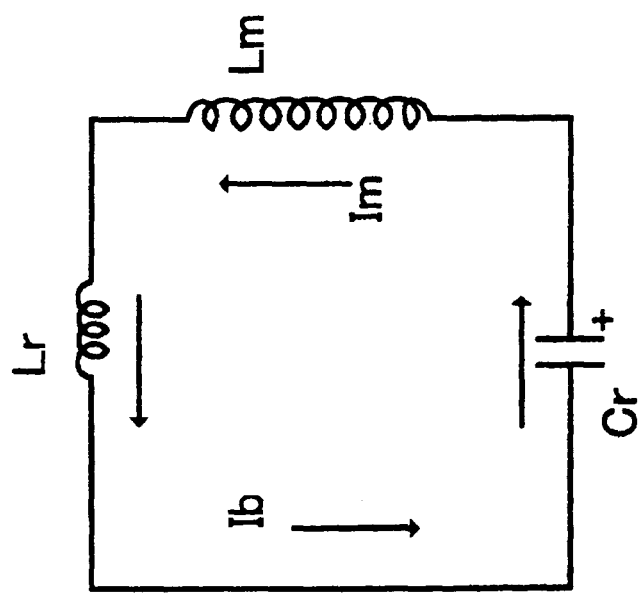
Figure 19:
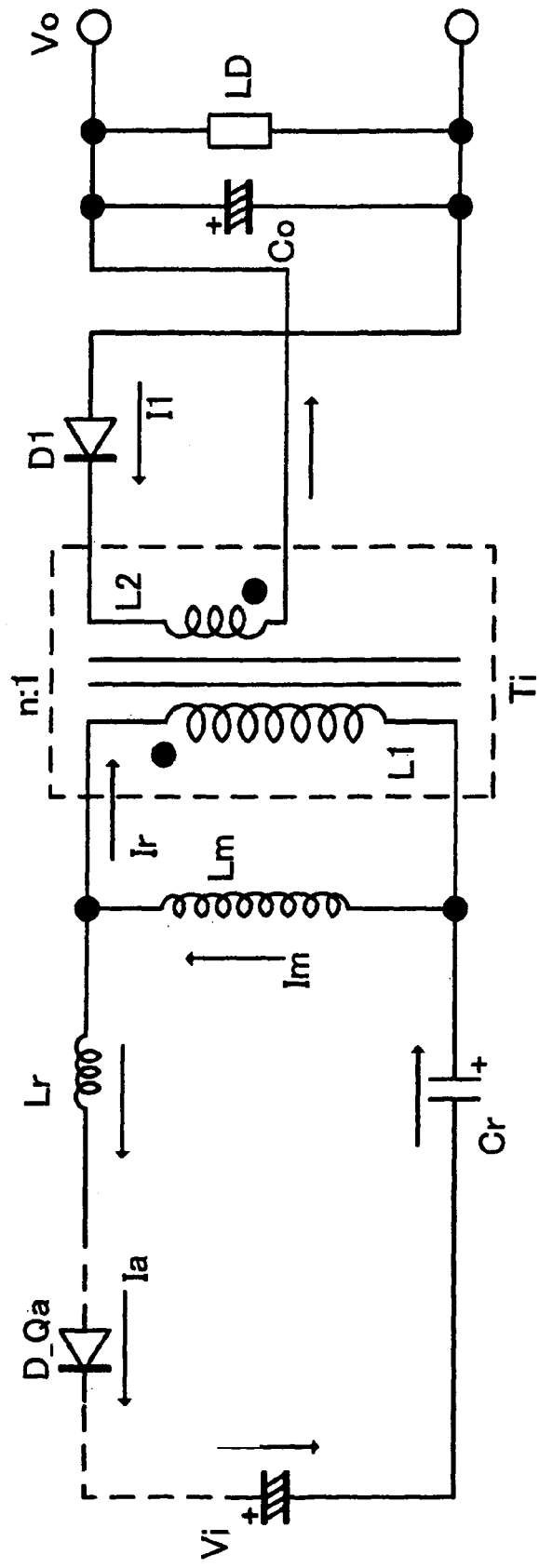
FIG. 19 is a circuit diagram illustrating an operational condition in a timing s10 of the first operational mode.
Figure 20:
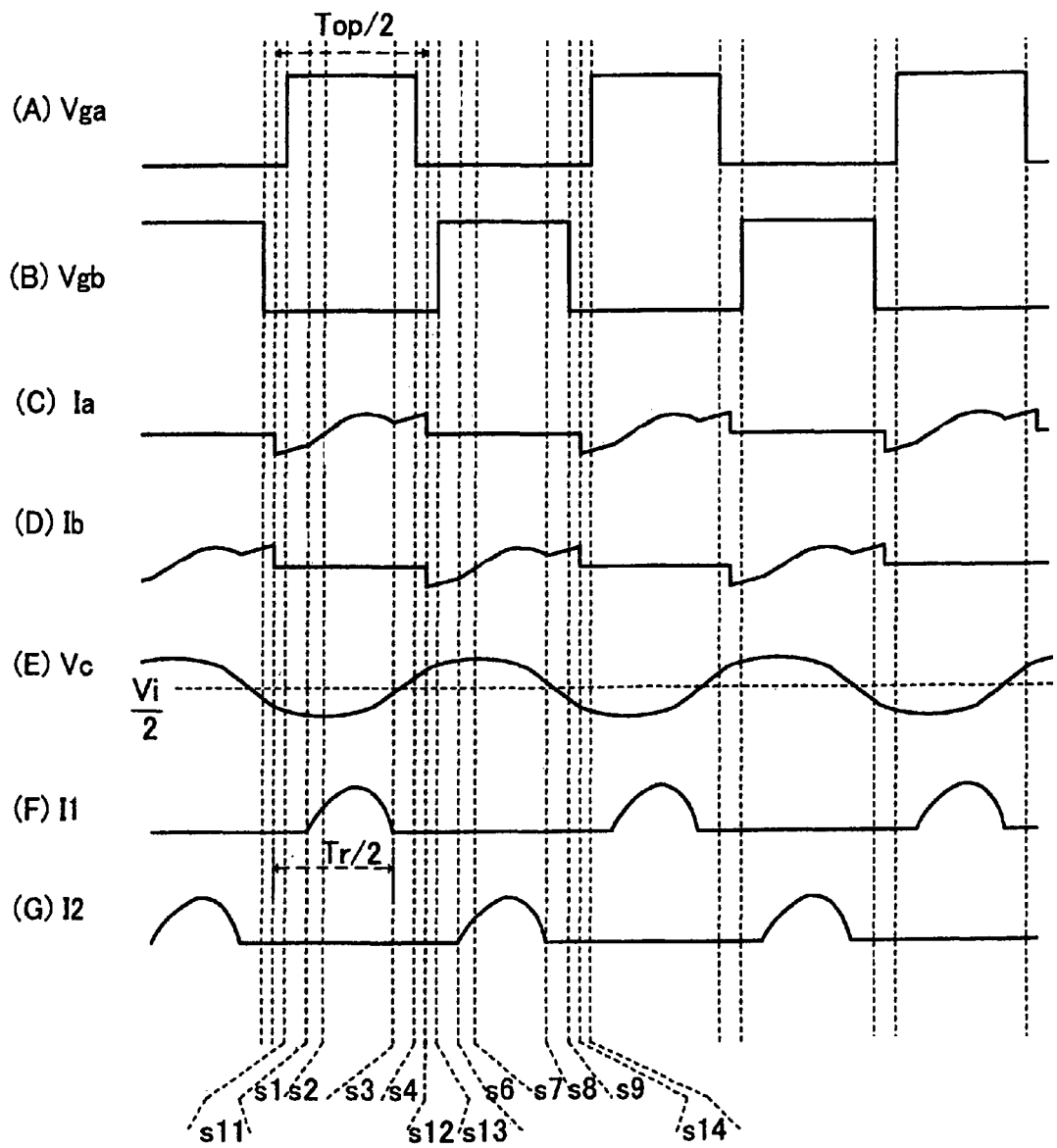
FIG. 20 is an operation waveform diagram illustrating a current and voltage waveform of each portion in a second operational mode of the current resonant type converter.
Figure 22:
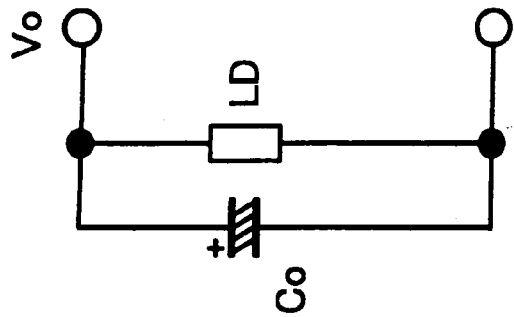
FIG. 22 is a circuit diagram illustrating an operational condition in a timing s12 of the second operational mode.
Figure 22:
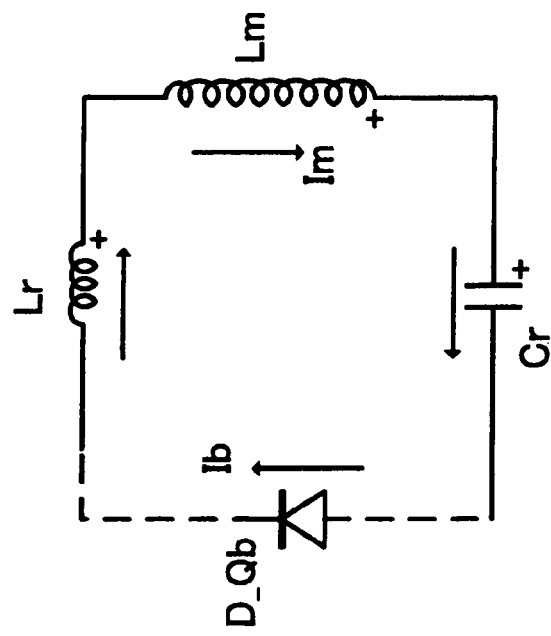
Figure 24:
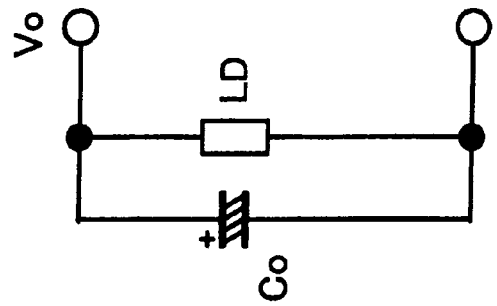
FIG. 24 is a circuit diagram illustrating an operational condition in a timing s14 of the second operational mode.
Figure 24:
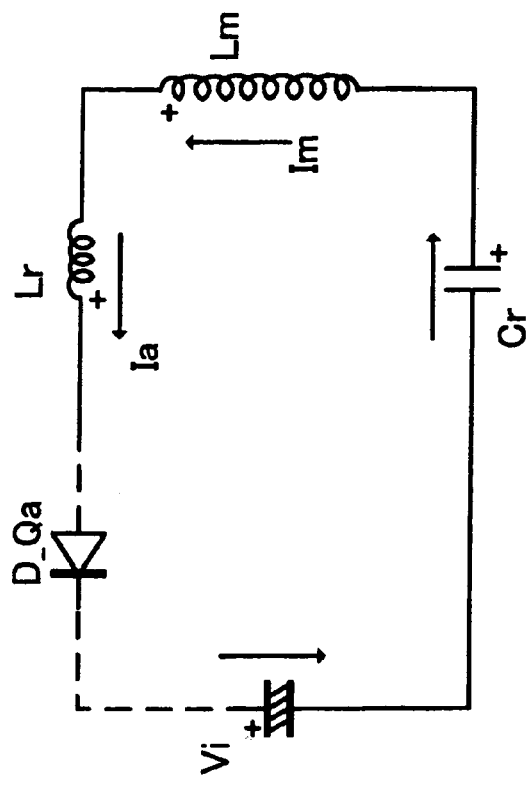
Figure 25:
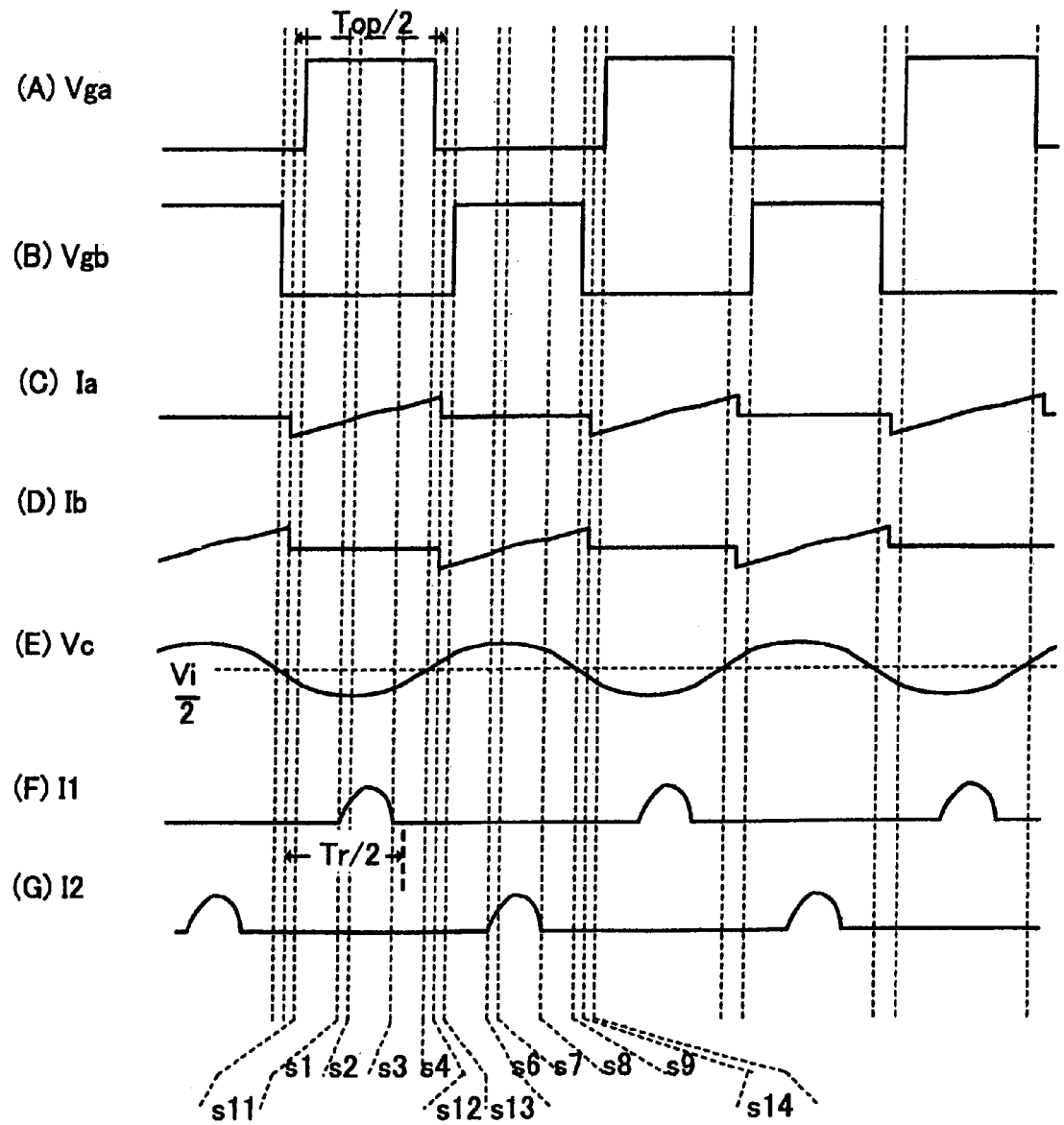
FIG. 25 is an operation waveform diagram illustrating a current and voltage waveform of each portion in a third operational mode of the current resonant type converter.
Figure 26:
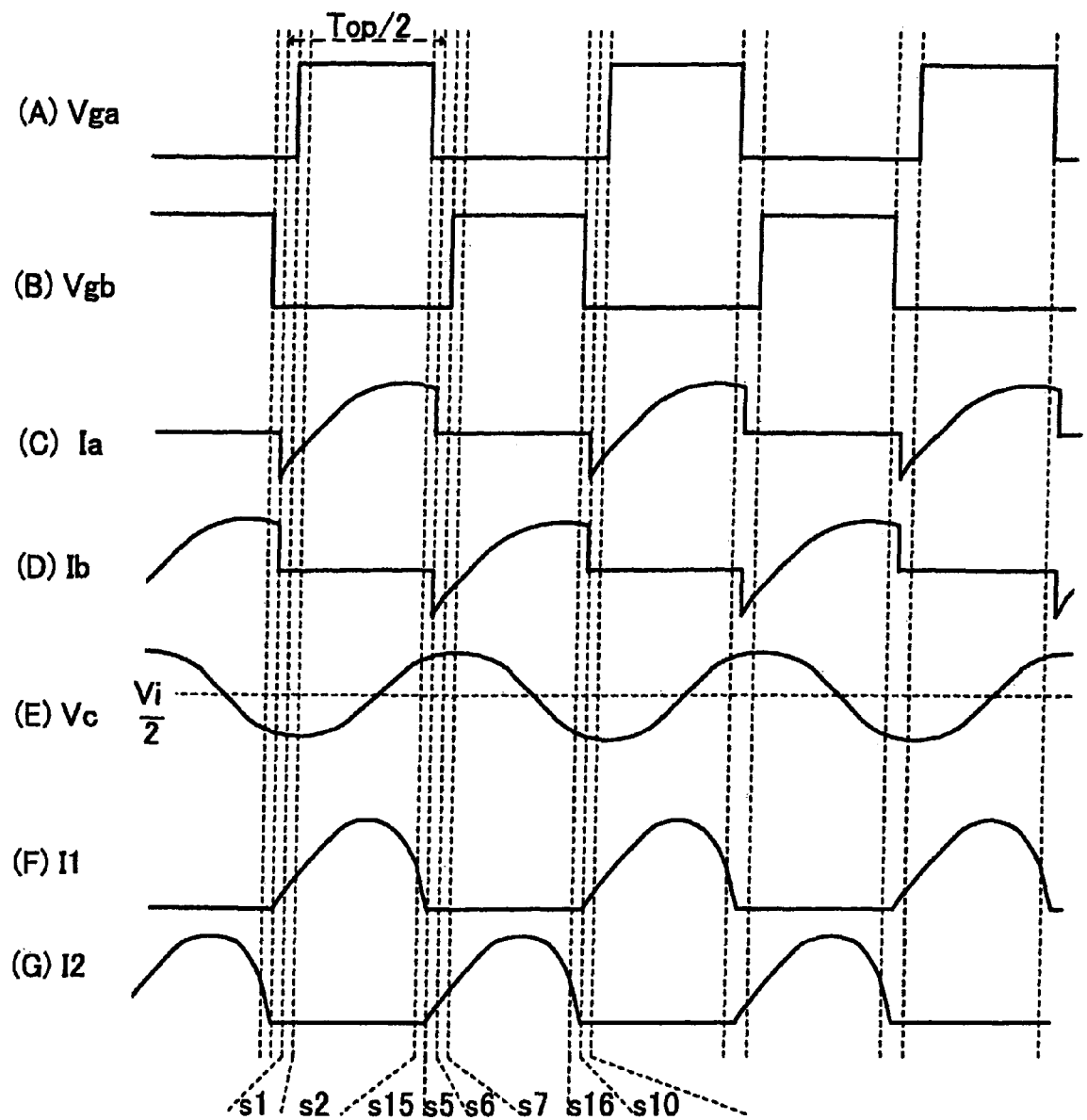
FIG. 26 is an operation waveform diagram illustrating a current and voltage waveform of each portion in a fourth operational mode of the current resonant type converter.
Figure 27:
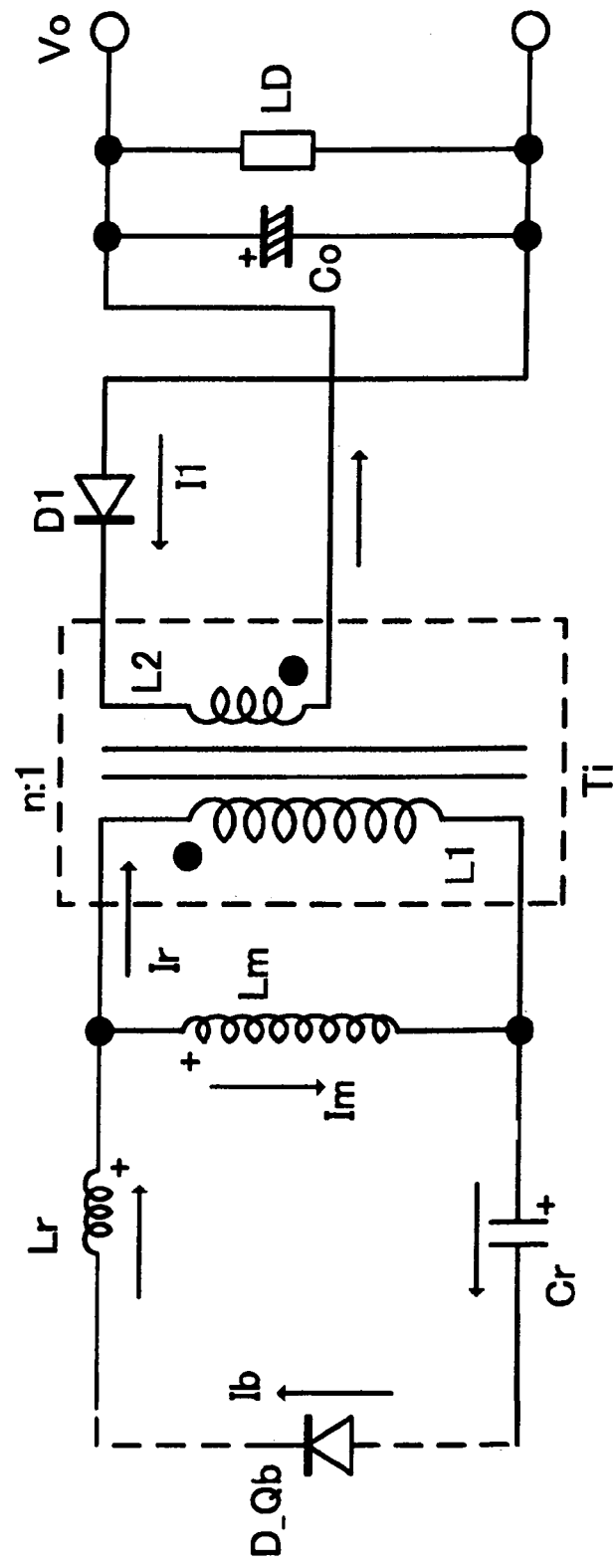
FIG. 27 is a circuit diagram illustrating an operational condition in a timing s15 of the fourth operational mode.
Figure 28:
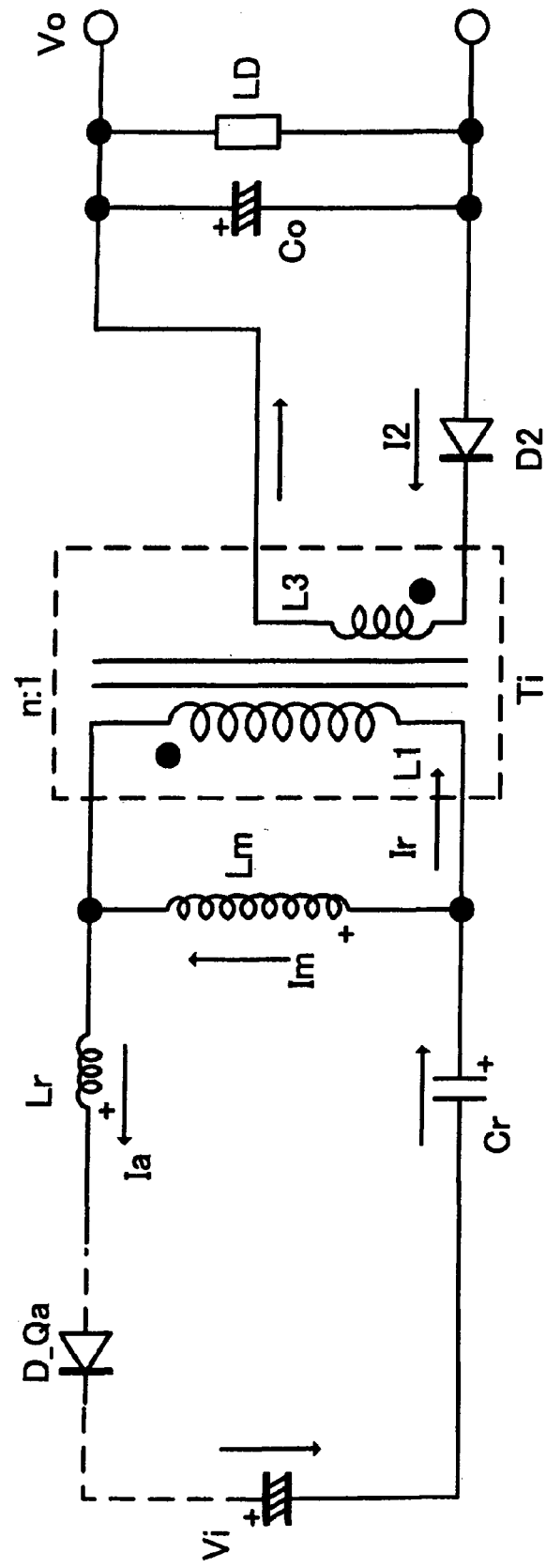
FIG. 28 is a circuit diagram illustrating an operational condition in a timing s16 of the fourth operational mode.
Figure 29:
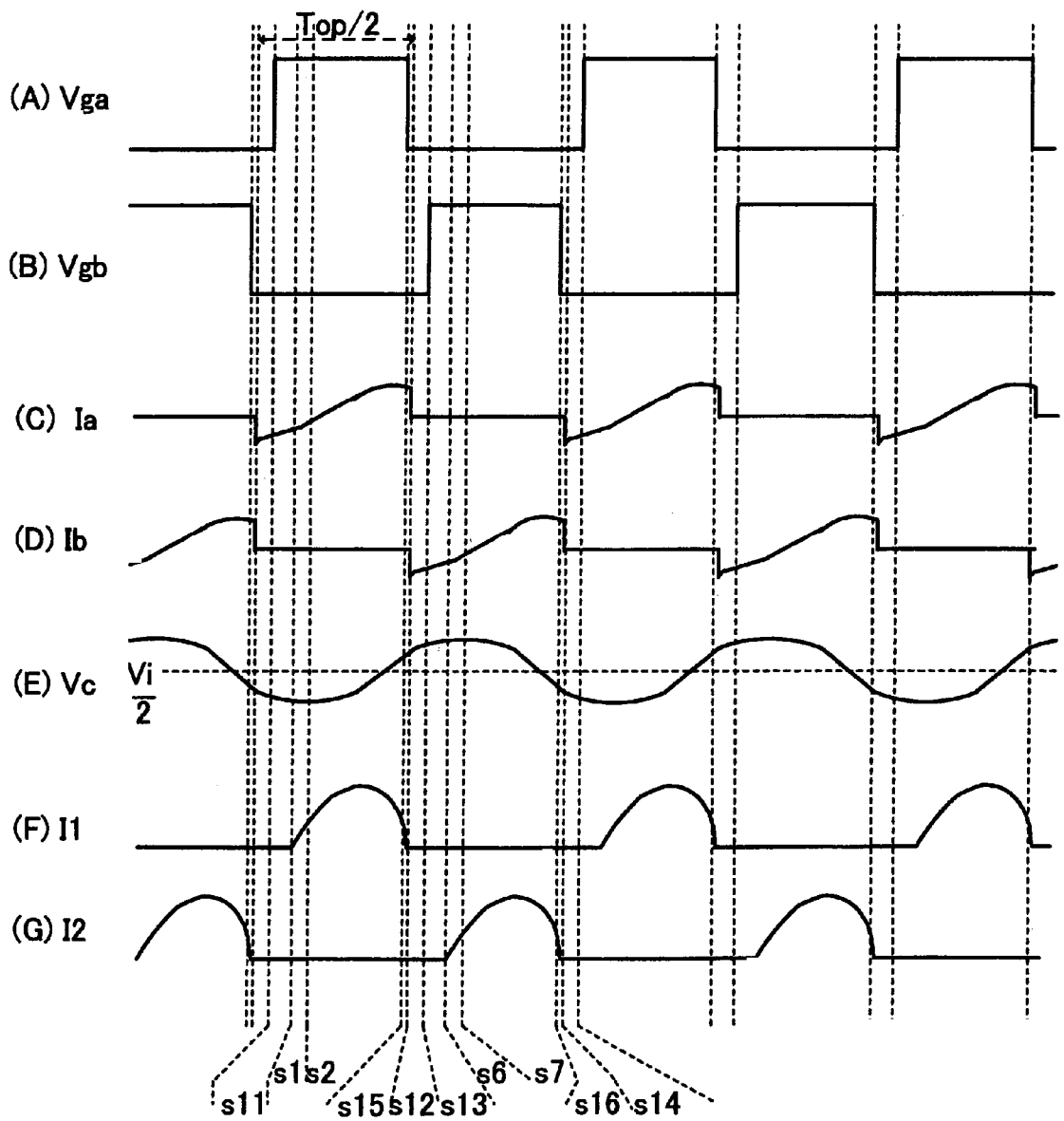
FIG. 29 is an operation waveform diagram illustrating a current and voltage waveform of each portion in a fifth operational mode of the current resonant type converter.
Figure 30:
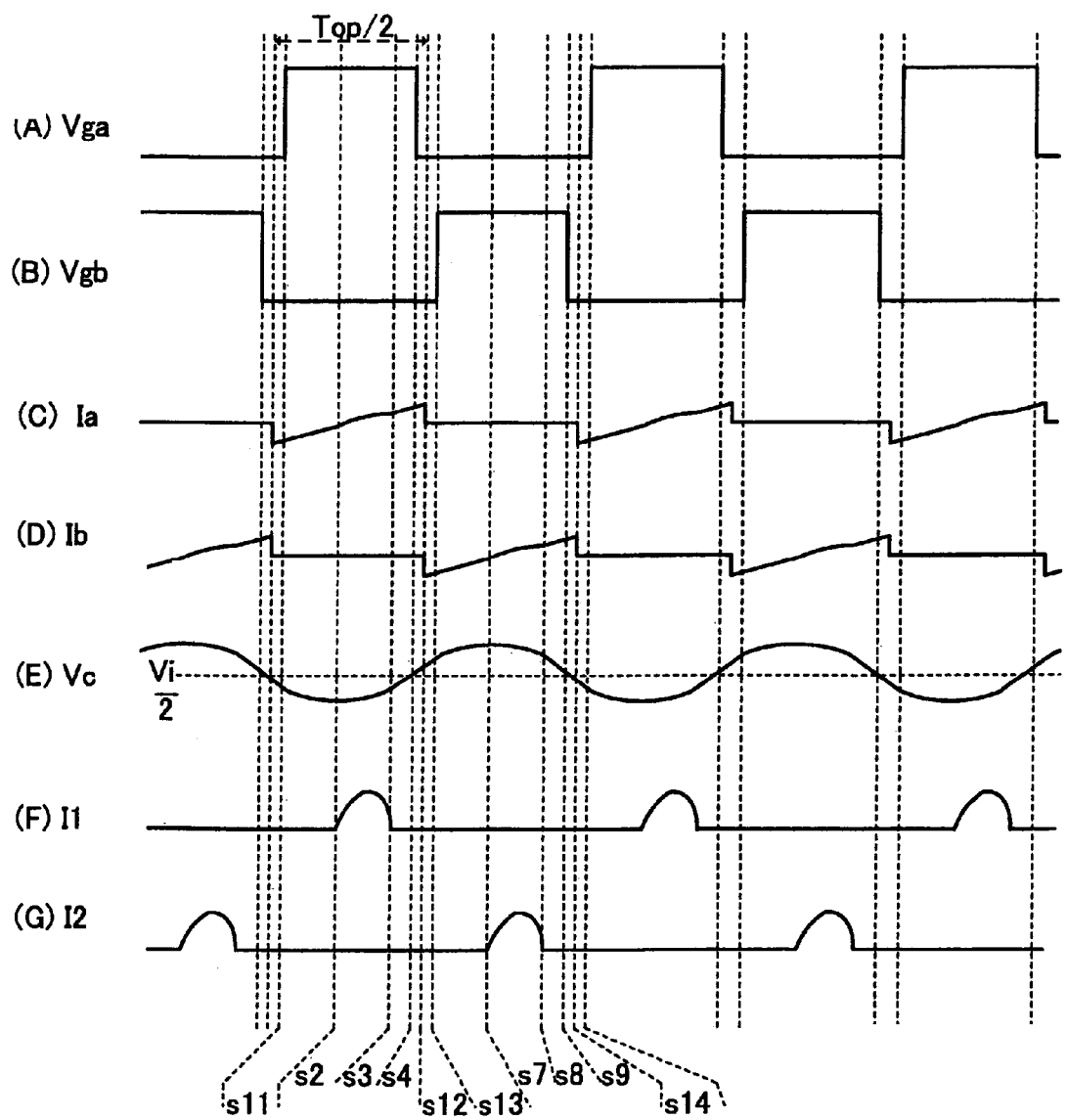
FIG. 30 is an operation waveform diagram illustrating a current and voltage waveform of each portion in a sixth operational mode of the current resonant type converter.
Figure 31:
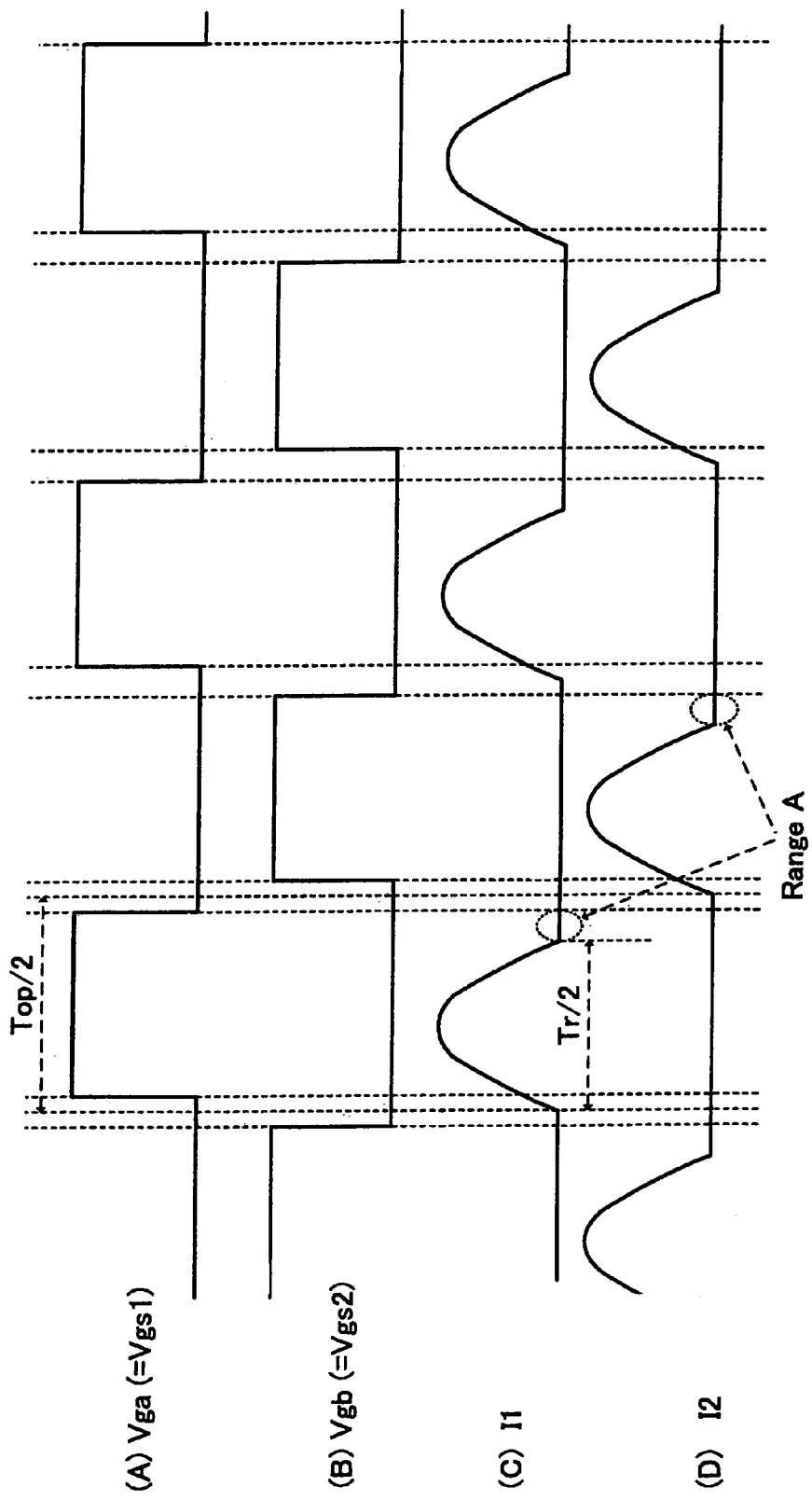
FIG. 31 is a diagram illustrating a secondary side current waveform induced via a transformer in the first operational mode.

FIG. 4 is a circuit diagram illustrating an overall configuration of the full bridge type of switching power source device.

In the full bridge type of switching power source device shown in FIG. 4, the gate signals Vga, Vgb, which alternately turn on and off in a predetermined timing, are generated in the drive circuit 3, and a first main switch element group of MOSFETs Qa1, Qa2 and second main switch element group of MOSFETs Qb1, Qb2 are alternately switched by the gate signals Vga, Vgb on the primary side of the transformer T. A current Ia flowing in the direction of the arrow in the timing in which the first main switch element group of MOSFETs Qa1, Qa2 is turned on, and a current Ib flowing in the direction of the arrow in the timing in which the second main switch element group of MOSFETs Qb1, Qb2 is turned on, in each case the input direct voltage Vi is applied to the series resonant circuit which includes the resonant inductor Lr and resonant capacitor Cr.

On the secondary side of the transformer T, the MOSFETs Qs1, Qs2, acting as synchronous rectification switch elements, supply the predetermined output voltage $V_0$ to the load LD by turning on and off the secondary currents I1, I2, induced from the transformer T, in response to operations of the first main switch element group of MOSFETs Qa1, Qa2, or of the second main switch element group of MOSFETs Qb1, Qb2.

In the maximum on width control circuits 41, 42, in synchronization with an on timing of the first main switch element group or second main switch element group of MOSFETs Qa1, Qa2, Qb1, and Qb2, the maximum on width signal Tmot which is the maximum on width period H (a period other than this is low (L)), for indicating the maximum on width of the predetermined time for which the MOSFETs Qs1, Qs2 are mandatorily turned off on exceeding the period, or the maximum on width completion signal Tmot 2 which is a signal indicating the completion of the maximum on width, is generated and output to the synchronous rectification MOSFETs Qs1, Qs2. Herein too, the start of the maximum on width, being indicated by the gate signals Vga, Vgb to the MOSFETs Qa1, Qa2, Qb1, and Qb2, is the same as the timing in which the gate signals Vga, Vgb become H, and the MOSFETs Qa1, Qa2, Qb1, and Qb2 are turned on. Then, in the synchronous control circuits 51, 52, which actually generate the synchronous drive signals Vgs 1, Vgs 2 of the synchronous rectification MOSFETs Qs1, Qs2, the timing of the MOSFETs Qs1, Qs2 being turned on is decided synchronized with the timing indicating the start of the maximum on width (that is, the timing of the maximum on width signal Tmot changing from L to H), or a timing of the conduction of the internal diodes Ds detected by the drain-to-source voltages Vds1, Vds2 of the MOSFETs Qs1, Qs2, whichever timing is later, and furthermore, the timing of the MOSFETs Qs1, Qs2 being turned off is decided synchronized with the off timing of the MOSFETs Qa1, Qa2, Qb1, and Qb2, or the timing of indicating the completion of the maximum on width, whichever timing is earlier.

The switching power source control circuit and the control method thereof being the same as in the case of the half bridge type of switching power source device, their descriptions will be omitted.

The disclosure of Japanese Patent Application No. 2009-132333 filed on Jun. 1, 2009 is incorporated as a reference.

While the invention has been explained with reference to the specific embodiments of the invention, the explanation is illustrative and the invention is limited only by the appended claims.

What is claimed is:

1. A switching power source device for generating a predetermined output voltage and supplying power to a load, comprising:
    a series resonant circuit including a current resonant inductor and a current resonant capacitor, an input direct voltage being applied to said series resonant circuit;
    a plurality of main switches for switching a current path of the series resonant circuit by alternately turning on and off;
    a transformer for inducing a secondary current from the series resonant circuit to a secondary side by on-off controlling the main switches on a primary side;
    a plurality of synchronous rectification switch elements for rectifying the secondary current of the transformer, each of the synchronous rectification switch elements having internal diodes connected in parallel and being turned on and off in response to the plurality of main switches;
    a maximum on width control circuit for ordering a start of a maximum on width to the synchronous rectification switch element in synchronization with a timing of turning on the main switches, and, after a predetermined time, ordering a completion of the maximum on width; and
    a synchronous control circuit for controlling an on period of the synchronous rectification switch element so as to turn on the synchronous rectification switch element in synchronization with a timing in which the maximum on width control circuit orders the start of the maximum on width, or a timing of a conduction of the internal diode detected as an inter-terminal voltage signal of the synchronous rectification switch element, whichever is later, and turn off the synchronous rectification switch element in synchronization with a timing in which the main switches are turned off, or a timing in which the maximum on width control circuit orders the completion of the maximum on width, whichever is earlier.

2. The switching power source device according to claim 1, wherein the transformer includes a leakage inductance forming at least a portion of the current resonant inductor in the series resonant circuit.

3. The switching power source device according to claim 1, wherein the main switches form a half bridge type or a full bridge type of converter for conducting a switching operation of the series resonant circuit, thereby generating an alternating current.

4. The switching power source device according to claim 1, wherein, in the synchronous control circuit, when a size of the load is equal to or less than a certain ratio with respect to a rated load, the synchronous rectification switch element is not turned on.

5. The switching power source device according to claim 1, wherein the maximum on width control circuit is configured to change a setting of a predetermined time from ordering the start of the maximum on width until ordering the completion thereof.

6. The switching power source device according to claim 1, wherein the synchronous rectification switch element is a metal-oxide-semiconductor field-effect transistor.

7. The switching power source device according to claim 6, wherein the internal diodes are parasite diodes of the metal-oxide-semiconductor field-effect transistor.

8. A switching power source control circuit including a series resonant circuit having a current resonant inductor and a current resonant capacitor, a plurality of main switches for switching a current path of the series resonant circuit by alternately turning on and off, a transformer for inducing a secondary current from the series resonant circuit to a secondary side by on-off controlling the main switches on a primary side, and a plurality of synchronous rectification switch elements for rectifying the secondary current of the transformer, each of the synchronous rectification switch elements having internal diodes connected in parallel and being turned on and off in response to the plurality of main switches, the switching power source control circuit comprising:
   a maximum on width control circuit for ordering a start of a maximum on width to the synchronous rectification switch element in synchronization with a timing of turning on the main switches and, after a predetermined time, ordering a completion of the maximum on width; and
   a synchronous control circuit for controlling an on period of the synchronous rectification switch element so as to turn on the synchronous rectification switch element in synchronization with a timing in which the maximum on width control circuit orders the start of the maximum on width, or a timing of a conduction of the internal diode detected as an inter-terminal voltage signal of the synchronous rectification switch element, whichever is later, and turn off the synchronous rectification switch element in synchronization with a timing in which the main switches are turned off, or a timing in which the maximum on width control circuit orders the completion of the maximum on width, whichever is earlier.

9. The switching power source control circuit according to claim 8, wherein, when a size of a load connected to the switching power source device is equal to or less than a certain ratio with respect to a rated load, the synchronous rectification switch element is not turned on.

10. The switching power source control circuit according to claim 8, wherein the maximum on width control circuit is configured to change a setting of the predetermined time from ordering the start of the maximum on width until ordering the completion thereof.

11. A switching power source device control method, wherein, when an input direct voltage is applied to a series resonant circuit including a current resonant inductor and a current resonant capacitor, and a predetermined output voltage is generated via a transformer, thereby supplying power to a load, a plurality of main switches switches a current path of the series resonant circuit by alternately turning on and off, and a plurality of synchronous rectification switch elements having internal diodes connected in parallel is turned on and off corresponding to the plurality of main switches, thereby rectifying a secondary current of the transformer, the switching power source device control method comprising the steps of:
   starting a maximum on width in the synchronous rectification switch element in synchronization with a timing of turning on the main switches and, after a predetermined time, ordering a completion of the maximum on width, in controlling an on period of the synchronous rectification switch element by using a synchronous control circuit, and
   turning on the synchronous rectification switch element in synchronization with a timing of starting the maximum on width, or a timing of conduction of the internal diodes detected as an inter-terminal voltage signal of the synchronous rectification switch element, whichever is later, and turning off the synchronous rectification switch element in synchronization with a timing in which the main switches are turned off, or a timing at which the maximum on width is completed, whichever is earlier.

* * * * *